(12) United States Patent
Sakayanagi et al.

(10) Patent No.: US 10,156,187 B2
(45) Date of Patent: Dec. 18, 2018

(54) COMBUSTION STATUS DETECTION DEVICE FOR INTERNAL COMBUSTION ENGINE

(71) Applicant: TOYOTA JIDOSHA KABUSHIKI KAISHA, Toyota-shi, Aichi-ken (JP)

(72) Inventors: Yoshihiro Sakayanagi, Mishima (JP); Yusuke Suzuki, Hadano (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 121 days.

(21) Appl. No.: 15/110,198

(22) PCT Filed: Dec. 25, 2014

(86) PCT No.: PCT/JP2014/084260
§ 371 (c)(1),
(2) Date: Jul. 7, 2016

(87) PCT Pub. No.: WO2015/105004
PCT Pub. Date: Jul. 16, 2015

(65) Prior Publication Data
US 2016/0333781 A1 Nov. 17, 2016

(30) Foreign Application Priority Data
Jan. 9, 2014 (JP) .................................. 2014-002630

(51) Int. Cl.
*F02B 77/08* (2006.01)
*F02D 35/02* (2006.01)
(Continued)

(52) U.S. Cl.
CPC .......... *F02B 77/085* (2013.01); *F02B 77/087* (2013.01); *F02D 35/023* (2013.01);
(Continued)

(58) Field of Classification Search
CPC .................. F02B 77/085; F02B 77/087; F02D 2200/0406; F02D 35/028; F02D 41/009; F02D 35/023; G01M 15/08
See application file for complete search history.

(56) References Cited

U.S. PATENT DOCUMENTS

| | | | |
|---|---|---|---|
| 2001/0052335 A1* | 12/2001 | Miyakubo | F02B 1/04 123/305 |
| 2008/0319632 A1* | 12/2008 | Miyashita | F02D 35/023 701/102 |

(Continued)

FOREIGN PATENT DOCUMENTS

| | | |
|---|---|---|
| JP | 2008-069713 A | 3/2008 |
| JP | 2012082712 A | 4/2012 |

(Continued)

*Primary Examiner* — Kyle R Quigley
(74) *Attorney, Agent, or Firm* — Hunton Andrews Kurth LLP

(57) ABSTRACT

A reciprocating internal combustion engine includes an in-cylinder pressure sensor and a crank angle sensor. Data of calculated heat release amount in synchronization with crank angle is calculated using in-cylinder pressure after absolute pressure correction. An amount of heat release amount variation is calculated as a difference between a first calculated heat release amount at a first crank angle on an advanced side of TDC and a second calculated heat release amount at a second crank angle symmetrical about TDC. An actual heat release amount is estimated based on the amount of heat release amount variation calculated using, as the first crank angle, a crank angle on an advanced side of a combustion start point and using, as the second crank angle, a crank angle on a retarded side of a combustion end point.

9 Claims, 10 Drawing Sheets

(51) Int. Cl.
*F02D 41/00* (2006.01)
*G01M 15/08* (2006.01)

(52) U.S. Cl.
CPC ......... *F02D 35/028* (2013.01); *F02D 41/009* (2013.01); *F02D 2200/0406* (2013.01); *G01M 15/08* (2013.01)

(56) References Cited

U.S. PATENT DOCUMENTS

| | | | |
|---|---|---|---|
| 2010/0004845 A1* | 1/2010 | Tunestal | G01M 15/09 701/102 |
| 2013/0238223 A1 | 9/2013 | Fischer et al. | |
| 2014/0048038 A1 | 2/2014 | Yasuda | |

FOREIGN PATENT DOCUMENTS

| | | |
|---|---|---|
| JP | 2012-225321 A | 11/2012 |
| JP | 2013-104407 A | 5/2013 |
| JP | 2013147977 A | 8/2013 |
| WO | 2012/147193 A1 | 11/2012 |

* cited by examiner

[Fig. 1]
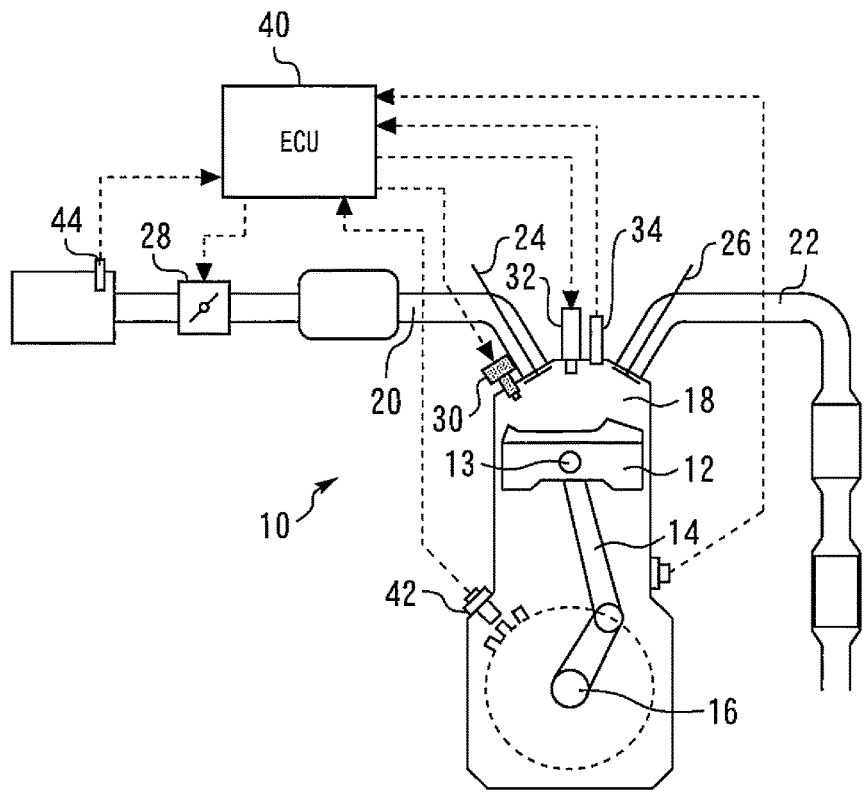
[Fig. 2A]
Example where absolute pressure correction is correctly performed
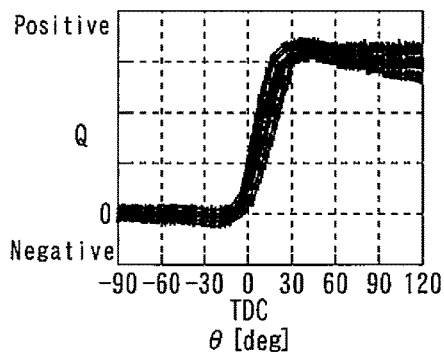
[Fig. 2B]
Example where absolute pressure correction is not correctly performed
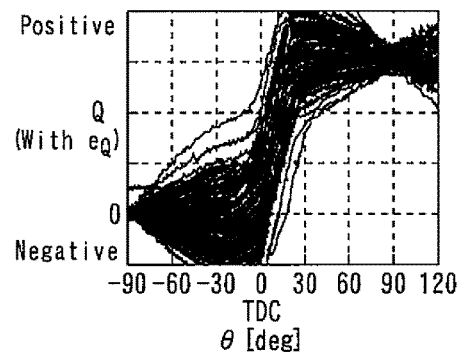

[Fig. 3A]
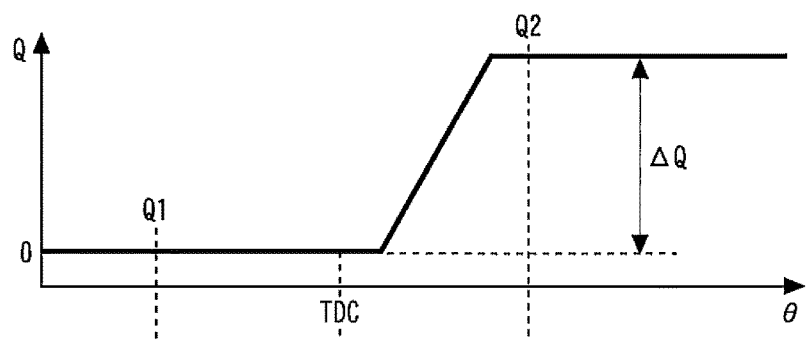
[Fig. 3B]
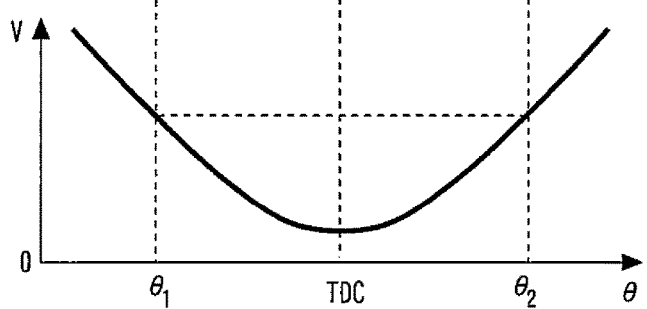

[Fig. 4A]
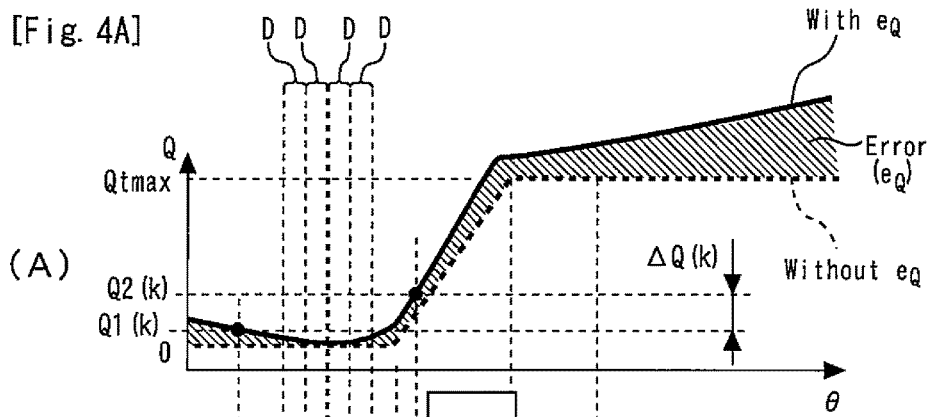
[Fig. 4B]
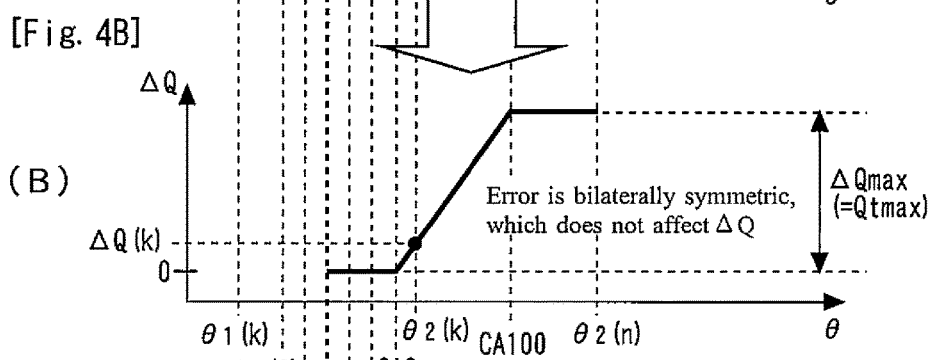
[Fig. 4C]
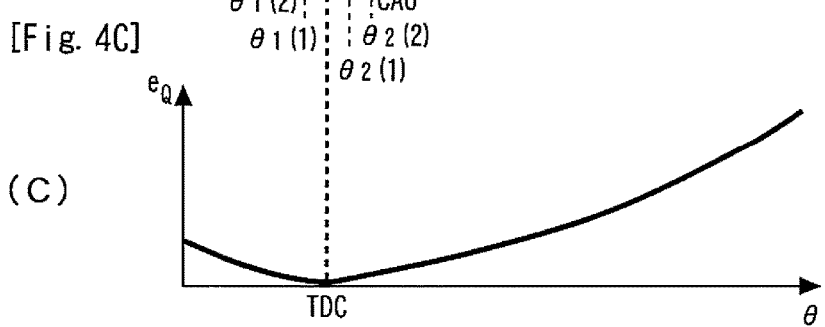
[Fig. 5]
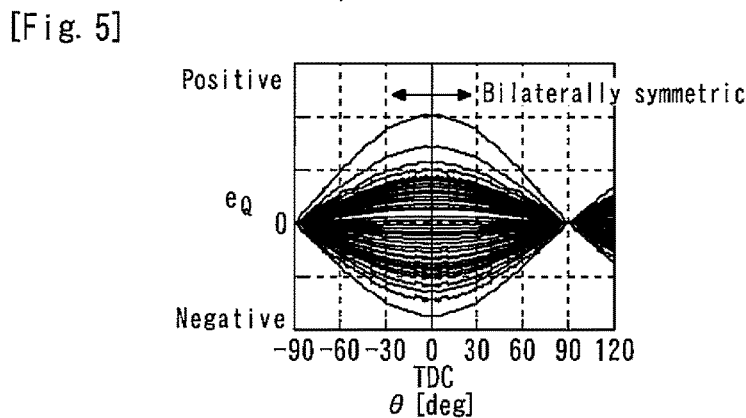

[Fig. 6]
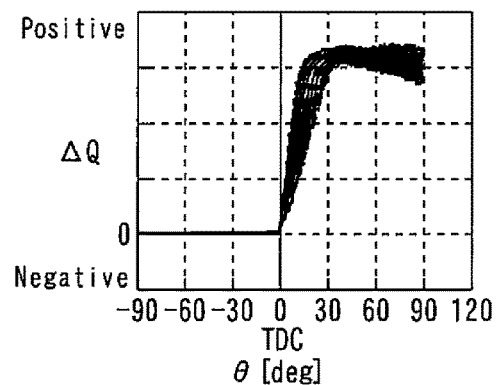
[Fig. 7]
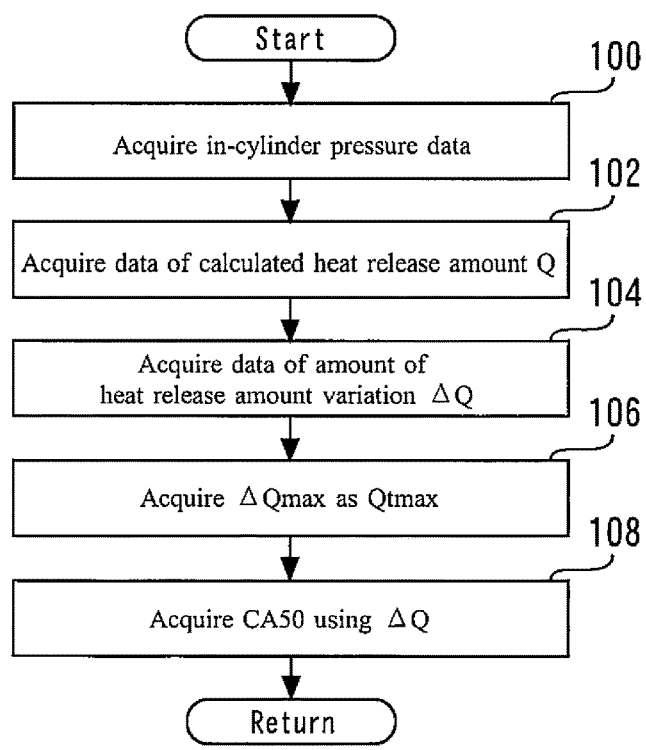

[Fig. 8]
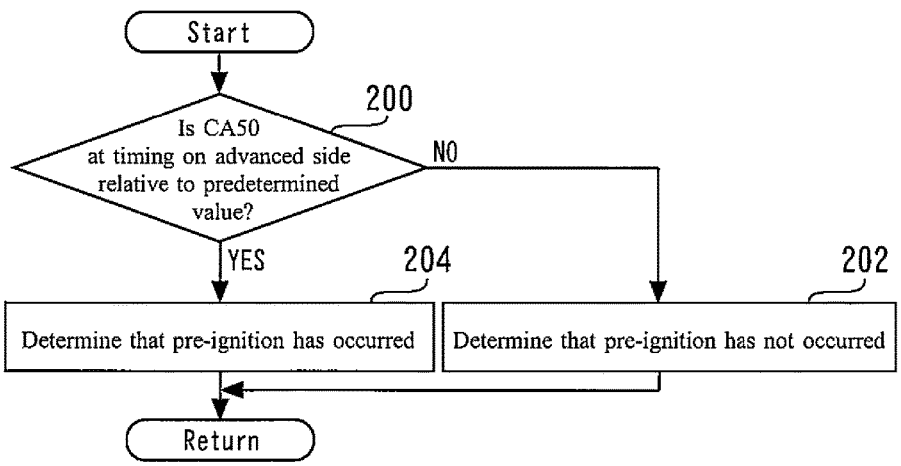
[Fig. 9]
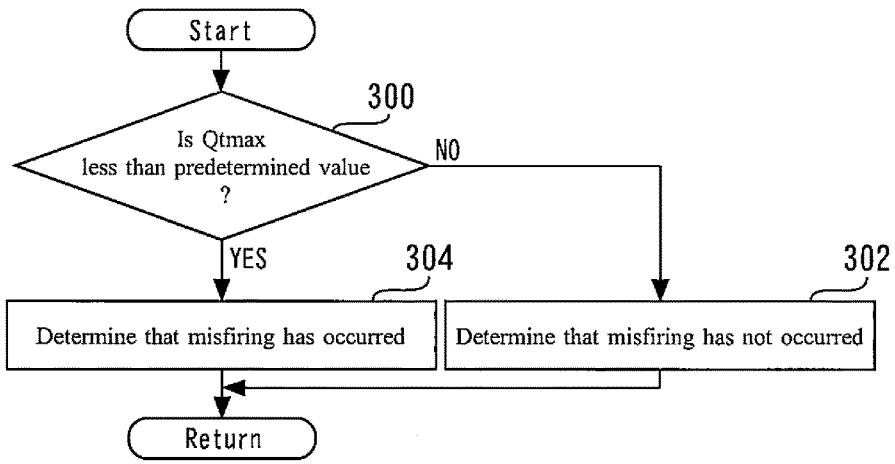

[Fig. 10A]
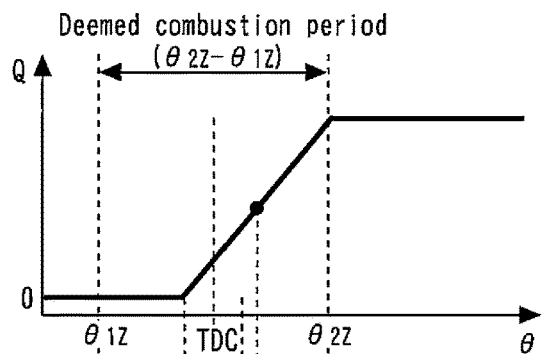
[Fig. 10B]
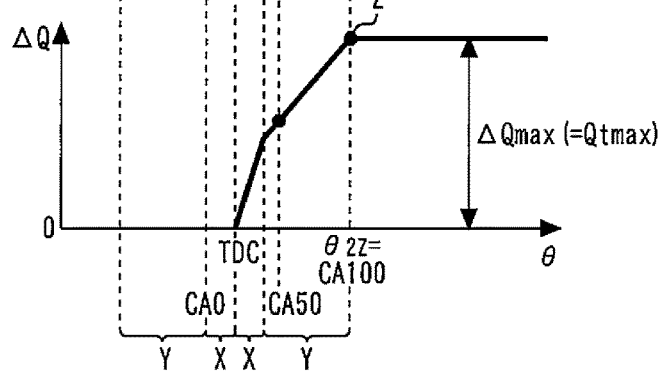
[Fig. 11A]
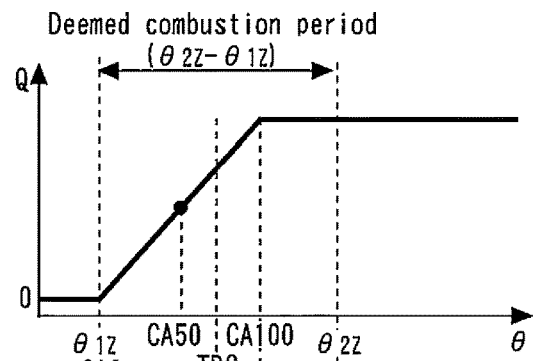
[Fig. 11B]
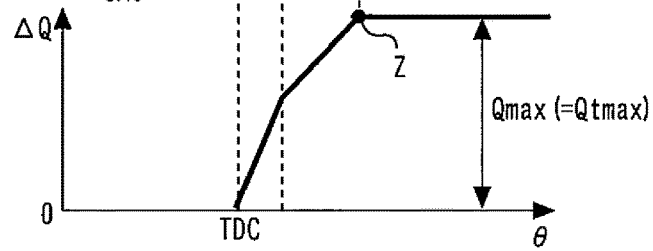

[Fig. 12]
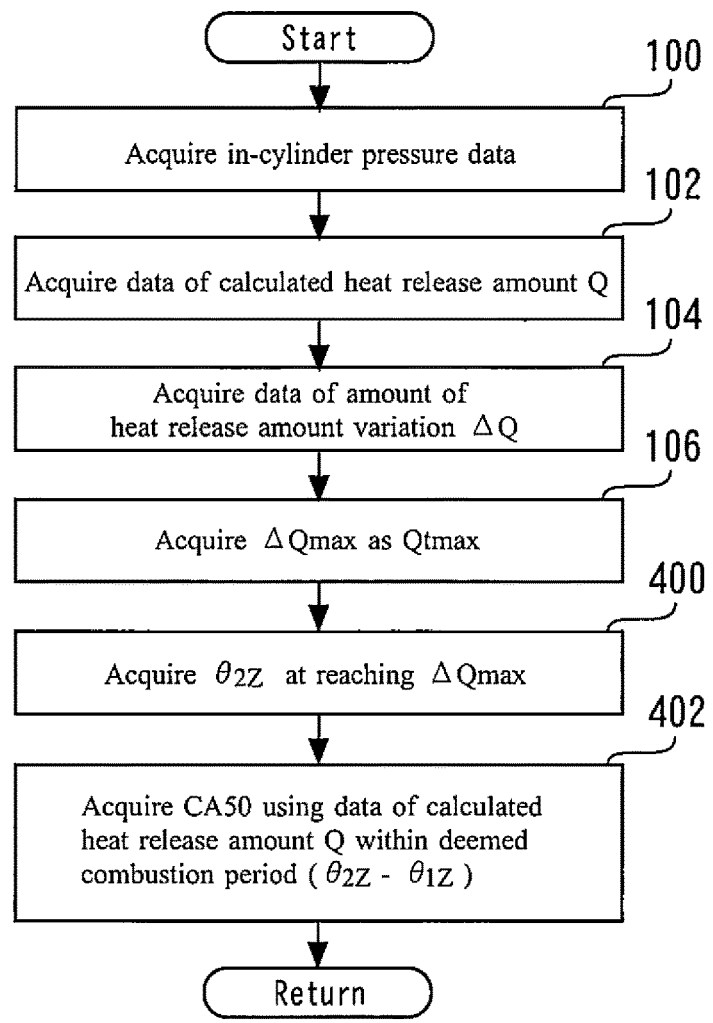

[Fig. 13A]
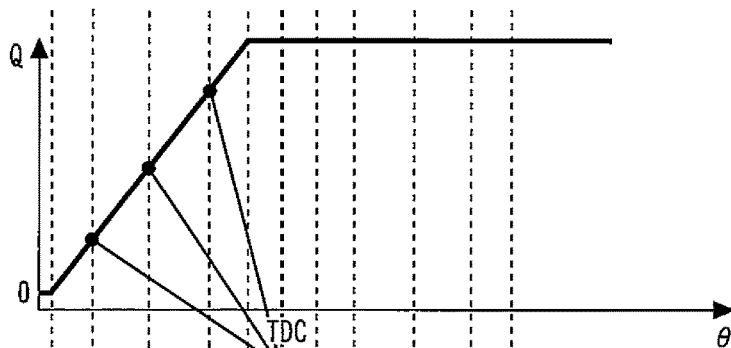
[Fig. 13B]
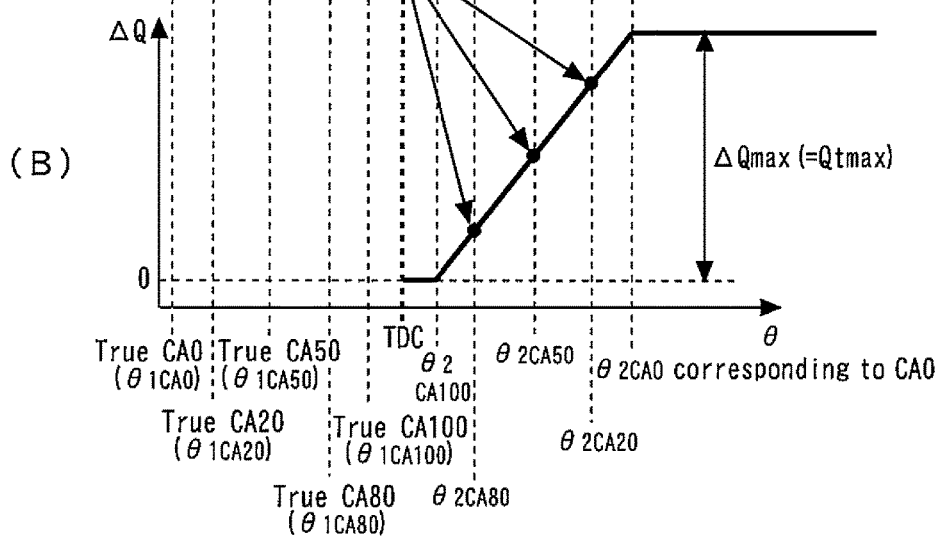

[Fig. 14]
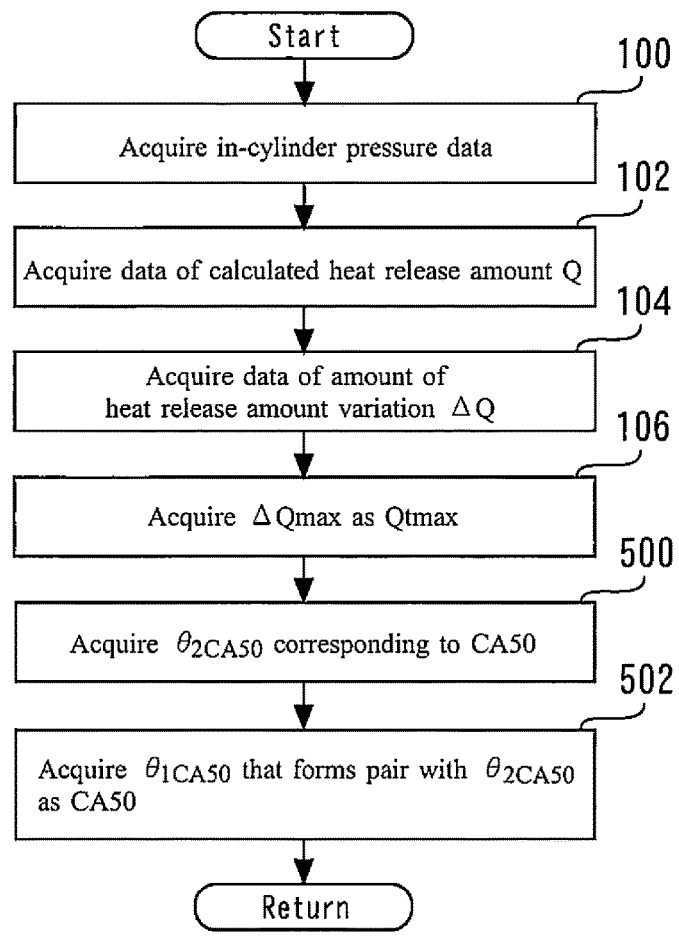

[Fig. 15]
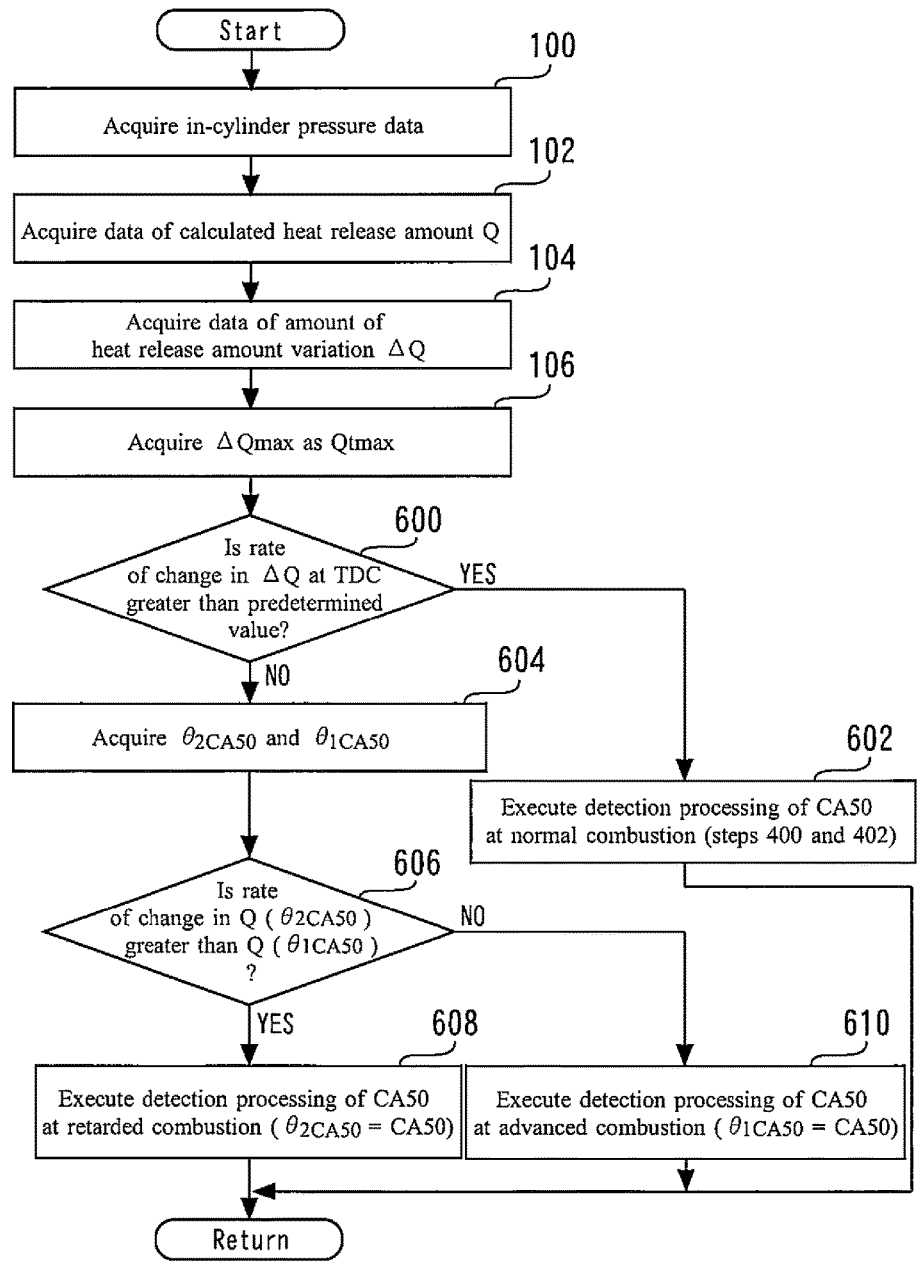

COMBUSTION STATUS DETECTION DEVICE FOR INTERNAL COMBUSTION ENGINE

CROSS-REFERENCE TO RELATED APPLICATIONS

This is a national phase application based on the PCT International Patent Application No. PCT/JP2014/084260 filed Dec. 25, 2014, claiming priority to Japanese Patent Application No. 2014-002630 filed Jan. 9, 2014, the entire contents of both of which are incorporated herein by reference.

TECHNICAL FIELD

The present invention relates to a combustion status detection device for an internal combustion engine, and more particularly to a combustion status detection device for an internal combustion engine that utilizes an in-cylinder pressure sensor.

BACKGROUND

A control device for an internal combustion engine equipped with an in-cylinder pressure sensor has already been disclosed, as described, for example, in PTL 1. The control device calculates an index value that serves as an index for an in-cylinder heat release amount based on an in-cylinder pressure that is detected by the in-cylinder pressure sensor. Further, the occurrence of pre-ignition is detected based on the index value.

CITATION LIST

Patent Literature

[Patent Literature 1]
 JP 2012-225321 A
[Patent Literature 2]
 JP 2008-069713 A
[Patent Literature 3]
 JP 2013-104407 A
[Patent Literature 4]
 WO 2012/147193

SUMMARY OF INVENTION

Technical Problem

Generally, the output of an in-cylinder pressure sensor is used with absolute pressure correction to cancel an offset deviation included in the original output value. If the absolute pressure correction is not correctly performed, a deviation will arise in a heat release amount calculated using the output of the in-cylinder pressure sensor (calculated heat release amount). Consequently, there is a possibility that it will not be possible to accurately ascertain a combustion status, such as detection of pre-ignition, utilizing the calculated heat release amount.

The present invention has been made to address the above described problem, and an object of the present invention is to provide a combustion status detection device for an internal combustion engine that can precisely estimate an in-cylinder actual heat release amount associated with combustion, even where absolute pressure correction of an in-cylinder pressure detected by an in-cylinder pressure sensor is not correctly performed.

Solution to Problem

A first aspect of the present invention is a combustion status detection device for an internal combustion engine that is a reciprocating internal combustion engine, comprising:
 crank angle acquisition means for acquiring a crank angle;
 an in-cylinder pressure sensor for detecting an in-cylinder pressure;
 heat release amount calculation means for using an in-cylinder pressure obtained after performing absolute pressure correction with respect to an in-cylinder pressure detected by the in-cylinder pressure sensor and a crank angle acquired by the crank angle acquisition means to calculate, in synchronization with a crank angle, calculated heat release amount data that is data of a heat release amount in a cylinder; and
 maximum actual heat release amount estimating means for, where a crank angle during a compression stroke is taken as a first crank angle, a crank angle which is a crank angle in an expansion stroke and at which an in-cylinder volume that is a same volume as an in-cylinder volume at the first crank angle is obtained is taken as a second crank angle, a calculated heat release amount that is calculated by the heat release amount calculation means as a heat release amount at the first crank angle is taken as a first calculated heat release amount, and a calculated heat release amount that is calculated by the heat release amount calculation means as a heat release amount at the second crank angle is taken as a second calculated heat release amount, estimating a maximum actual heat release amount based on an amount of heat release amount variation that is a difference between the first calculated heat release amount at the first crank angle on an advanced side relative to a combustion start point and the second calculated heat release amount at the second crank angle on a retarded side relative to a combustion end point.

A second aspect of the present invention is the combustion status detection device according to the first aspect of the present invention, further comprising heat release amount variation calculation means for calculating, in synchronization with a crank angle, data of amount of heat release amount variation that is a difference between the first calculated heat release amount and the second calculated heat release amount in a crank angle period including a combustion period,
 wherein the maximum actual heat release amount estimating means estimates a maximum actual heat release amount using a maximum value of the data of amount of heat release amount variation.

A third aspect of the present invention is the combustion status detection device according to the first or second aspect of the present invention, further comprising heat release amount variation calculation means for calculating, in synchronization with a crank angle, data of amount of heat release amount variation that is a difference between the first calculated heat release amount and the second calculated heat release amount in a crank angle period including a combustion period,
 wherein the heat release amount variation calculation means calculates the amount of the heat release amount variation as a value obtained by subtracting the first calculated heat release amount from the second calculated heat release amount, and use the calculated heat release amount data to acquire the data of amount of the heat release amount variation in association with the second crank angle, the combustion status detection device further comprising first combustion point acquisition means for acquiring, at a time of normal combustion in which a combustion start point is a crank angle on an advanced side relative to a compression top dead center and a combustion end point is a crank angle on a retarded side relative to the compression top dead center, a predetermined fraction combustion point that is a crank angle at which mass fraction burned reaches a predetermined fraction, wherein the first combustion point acquisition means acquires the predetermined fraction combustion point at the time of normal combustion based on the calculated heat release amount data during a deemed combustion period obtained by regarding, as a combustion end point, a heat-release-amount-variation maximum crank angle at which an amount of heat release amount variation in the data of amount of heat release amount variation reaches a maximum value, and by regarding, as a combustion start point, a specified first crank angle which is a crank angle positioned on an opposite side to the heat-release-amount-variation maximum crank angle across the compression top dead center and at which an in-cylinder volume is obtained that is a same volume as an in-cylinder volume at the heat-release-amount-variation maximum crank angle.

A fourth aspect of the present invention is the combustion status detection device according to the third aspect of the present invention, wherein, where a rate of change in the calculated heat release amount in a vicinity of the compression top dead center in the calculated heat release amount data, or a rate of change in the amount of heat release amount variation in a vicinity of the compression top dead center in the data of amount of heat release amount variation is greater than a predetermined value, the first combustion point acquisition means determines that normal combustion is being performed.

A fifth aspect of the present invention is the combustion status detection device according to any one of the first to fourth aspects of the present invention, further comprising heat release amount variation calculation means for calculating, in synchronization with a crank angle, data of amount of heat release amount variation that is a difference between the first calculated heat release amount and the second calculated heat release amount in a crank angle period including a combustion period, wherein the heat release amount variation calculation means calculates the amount of the heat release amount variation as a value obtained by subtracting the first calculated heat release amount from the second calculated heat release amount, and use the calculated heat release amount data to acquire the data of amount of the heat release amount variation in association with the second crank angle, the combustion status detection device further comprising second combustion point acquisition means for, at a time of retarded combustion in which a combustion start point is a crank angle equal to a compression top dead center or a crank angle on a retarded side relative to the compression top dead center, acquiring a predetermined fraction combustion point that is a crank angle at which mass fraction burned reaches a predetermined fraction, wherein the second combustion point acquisition means regards, as a combustion start point, a crank angle at which the amount of heat release amount variation starts to increase from zero in the data of amount of heat release amount variation and regards, as a combustion end point, a heat-release-amount-variation maximum crank angle at which the amount of heat release amount variation reaches a maximum value in the data of amount of heat release amount variation data, and acquires, as the predetermined fraction combustion point at the time of retarded combustion, a specified second crank angle at which the amount of heat release amount variation in the data of amount of heat release amount variation reaches the predetermined fraction with respect to a maximum value of the amount of heat release amount variation.

A sixth aspect of the present invention is the combustion status detection device according to the fifth aspect of the present invention, further comprising specified first crank angle acquisition means for acquiring a specified first crank angle which is a crank angle positioned on an opposite side to the specified second crank angle across the compression top dead center and at which an in-cylinder volume is obtained that is a same volume as an in-cylinder volume at the specified second crank angle, wherein, where a rate of change in the calculated heat release amount in a vicinity of the compression top dead center in the calculated heat release amount data, or a rate of change in the amount of heat release amount variation in a vicinity of the compression top dead center in the data of amount of heat release amount variation is equal to or less than a predetermined value, and where a rate of change in the calculated heat release amount at the specified second crank angle in the calculated heat release amount data is larger than a rate of change in the calculated heat release amount at the specified first crank angle in the calculated heat release amount data, the second combustion point acquisition means determines that retarded combustion is being performed.

A seventh aspect of the present invention is the combustion status detection device according to any one of the first to sixth aspects of the present invention, further comprising heat release amount variation calculation means for calculating, in synchronization with a crank angle, data of amount of heat release amount variation that is a difference between the first calculated heat release amount and the second calculated heat release amount in a crank angle period including a combustion period, wherein the heat release amount variation calculation means calculates the amount of the heat release amount variation as a value obtained by subtracting the first calculated heat release amount from the second calculated heat release amount, and use the calculated heat release amount data to acquire the data of amount of the heat release amount variation in association with the second crank angle, the combustion status detection device further comprising third combustion point acquisition means for, at a time of advanced combustion in which a combustion end point is a crank angle equal to a compression top dead center or a crank angle on an advanced side relative to the compression top dead center, acquiring a predetermined fraction combustion point that is a crank angle at which mass fraction burned reaches a predetermined fraction, wherein the third combustion point acquisition means includes:

specified second crank angle acquisition means for regarding, as a combustion end point, a crank angle at which the amount of heat release amount variation starts to increase from zero in the data of amount of heat release amount variation and regarding, as a combustion start point, a heat-release-amount-variation maximum crank angle at which the amount of heat release amount variation reaches a maximum value in the data of amount of heat release amount variation, and acquiring a specified second crank angle at which an absolute value of a difference between a maximum value of the amount of heat release amount variation and an amount of heat release amount variation reaches the predetermined fraction with respect to the maximum value of the amount of heat release amount variation; and specified first crank angle acquisition means for acquiring a specified first crank angle which is a crank angle positioned on an opposite side to the specified second crank angle across the compression top dead center and at which an in-cylinder volume is obtained that is a same volume as an in-cylinder volume at the specified second crank angle, wherein the third combustion point acquisition means acquires the specified first crank angle as the predetermined fraction combustion point at the time of advanced combustion.

An eighth aspect of the present invention is the combustion status detection device according to the seventh aspect of the present invention, wherein, where a rate of change in the calculated heat release amount in a vicinity of the compression top dead center in the calculated heat release amount data, or a rate of change in the amount of heat release amount variation in a vicinity of the compression top dead center in the data of amount of heat release amount variation is equal to or less than a predetermined value, and where a rate of change in the calculated heat release amount at the specified first crank angle in the calculated heat release amount data is larger than a rate of change in the calculated heat release amount at the specified second crank angle in the calculated heat release amount data, the third combustion point acquisition means determines that advanced combustion is being performed.

A ninth aspect of the present invention is the combustion status detection device according to any one of the third to eighth aspects of the present invention, further comprising pre-ignition determination means for determining that pre-ignition has occurred when the predetermined fraction combustion point is advanced relative to a predetermined first determination value.

A tenth aspect of the present invention is the combustion status detection device according to the second aspect of the present invention, further comprising misfiring determination means for determining that misfiring has occurred when a maximum actual heat release amount estimated by the maximum actual heat release amount estimating means is less than a predetermined second determination value.

Advantageous Effects of Invention

Even where absolute pressure correction of an in-cylinder pressure detected by an in-cylinder pressure sensor is not correctly performed, an amount of heat release amount variation that is a difference between a first calculated heat release amount at a first crank angle in a compression stroke and a second calculated heat release amount at a second crank angle which is a crank angle in an expansion stroke and at which the same in-cylinder volume as an in-cylinder volume at the first crank angle is obtained can cancel a deviation in a calculated heat release amount produced due to an error of the absolute pressure correction of the in-cylinder pressure. Further, by using a first crank angle on an advanced side relative to the combustion start point and also using a second crank angle on a retarded side relative to the combustion end point, an amount of heat release amount variation can be calculated that shows an in-cylinder maximum actual heat release amount associated with combustion. Therefore, according to the first aspect of the present invention, even where absolute pressure correction of an in-cylinder pressure is not correctly performed, a maximum actual heat release amount can be precisely estimated.

A maximum value of data of amount of heat release amount variation that takes, as an object, a crank angle period including a combustion period shows a maximum actual heat release amount. Therefore, according to the second aspect of the present invention, even where absolute pressure correction of an in-cylinder pressure is not correctly performed, an in-cylinder actual heat release amount associated with combustion can be precisely estimated.

According to the third aspect of the present invention, a predetermined fraction combustion point that is a crank angle at which mass fraction burned reaches a predetermined fraction can be precisely acquired by a method suitable for a time of normal combustion in which a combustion start point is a crank angle on an advanced side relative to the compression top dead center and a combustion end point is a crank angle on a retarded side relative to the compression top dead center.

According to the fourth aspect of the present invention, it is possible to appropriately determine that normal combustion is being performed.

According to the fifth aspect of the present invention, a predetermined fraction combustion point can be precisely acquired by a method that is suitable for a time of retarded combustion in which the combustion start point is a crank angle that is the same as the compression top dead center or is on a retarded side relative to the compression top dead center.

According to the sixth aspect of the present invention, it is possible to appropriately determine that retarded combustion is being performed.

According to the seventh aspect of the present invention, a predetermined fraction combustion point can be precisely acquired by a method suitable for a time of advanced combustion (for example, time of abnormal combustion) in which the combustion end point is a crank angle that is the same as the compression top dead center or is on an advanced side relative to the compression top dead center.

According to the eighth aspect of the present invention, it is possible to appropriately determine that advanced combustion is being performed.

According to the ninth aspect of the present invention, pre-ignition can be precisely detected utilizing a predetermined fraction combustion point acquired by any one of the third to eighth aspects of the present invention.

According to the tenth aspect of the present invention, accurate misfire detection can be performed utilizing a maximum actual heat release amount acquired by the second aspect of the present invention.

BRIEF DESCRIPTION OF DRAWINGS

FIG. 1 is a view for describing a system configuration of an internal combustion engine according to Embodiment 1 of the present invention;

FIGS. 2A and 2B are views for describing an issue relating to absolute pressure correction of an output value of an in-cylinder pressure sensor;

FIGS. 3A and 3B are views that illustrate the respective relations of the heat release amount Q and the in-cylinder volume V with respect to the crank angle $\theta$;

FIGS. 4A through 4C are views that illustrate the respective relations of the calculated heat release amount Q, the amount of heat release amount variation ΔQ and the deviation amount $e_Q$ with respect to the crank angle θ;

FIG. 5 is a view that illustrates waveforms of the deviation amount $e_Q$ of the calculated heat release amount Q;

FIG. 6 is a view that illustrates waveforms of the amount of heat release amount variation ΔQ calculated based on the calculated heat release amount Q (including the deviation amount $e_Q$) shown in FIG. 2B;

FIG. 7 is a flowchart of a routine executed in Embodiment 1 of the present invention;

FIG. 8 is a flowchart of a pre-ignition detection processing routine executed in Embodiment 1 of the present invention;

FIG. 9 is a flowchart of a misfiring detection processing routine executed in Embodiment 1 of the present invention;

FIGS. 10A and 10B are views that represent the relation between each of the calculated heat release amount Q and the amount of heat release amount variation ΔQ, and the crank angle θ at a time of normal combustion;

FIGS. 11A and 11B are views that represent the relation between each of the calculated heat release amount Q and the amount of heat release amount variation ΔQ, and the crank angle θ at a time of normal combustion;

FIG. 12 is a flowchart of a routine executed in Embodiment 2 of the present invention;

FIGS. 13A and 13B are views that represent the relation between each of the calculated heat release amount Q and the amount of heat release amount variation ΔQ and the crank angle θ at a time of advanced combustion;

FIG. 14 is a flowchart of a routine executed in Embodiment 3 of the present invention; and FIG. 15 is a flowchart of a routine executed in Embodiment 4 of the present invention.

DESCRIPTION OF EMBODIMENTS

Embodiment 1

[System Configuration of Embodiment 1]

FIG. 1 is a view for describing a system configuration of an internal combustion engine 10 according to Embodiment 1 of the present invention. The system shown in FIG. 1 includes, as one example, a spark-ignition internal combustion engine 10. A piston 12 is provided in each cylinder of the internal combustion engine 10. The piston 12 is connected through a connecting rod 14 to a crankshaft 16. That is, the internal combustion engine 10 of the present embodiment is a reciprocating internal combustion engine that includes a piston-crank mechanism. A combustion chamber 18 is formed at the top side of the piston 12 inside the cylinder. An intake passage 20 and an exhaust passage 22 communicate with the combustion chamber 18.

An intake valve 24 is provided in an intake port of the intake passage 20. The intake valve 24 opens and closes the intake port. An exhaust valve 26 is provided in an exhaust port of the exhaust passage 22. The exhaust valve 26 opens and closes the exhaust port. An electronically controlled throttle valve 28 is also provided in the intake passage 20.

Each cylinder of the internal combustion engine 10 is provided with a fuel injection valve 30 for injecting fuel directly into the combustion chamber 18 (into the cylinder), and a spark plug 32 of an ignition device (not shown in the drawing) for igniting an air-fuel mixture. An in-cylinder pressure sensor 34 for detecting an in-cylinder pressure is also mounted in each cylinder.

The system of the present embodiment also includes an (electronic control unit) ECU 40. In addition to the aforementioned in-cylinder pressure sensor 34, various sensors for acquiring the operating state of the internal combustion engine 10 such as a crank angle sensor 42 for acquiring the engine speed and an air flow sensor 44 for detecting an intake air amount are connected to an input part of the ECU 40. Further, various actuators for controlling the operation of the internal combustion engine 10 such as the throttle valve 28, the fuel injection valve 30 and the ignition device that are described above are connected to an output part of the ECU 40. The ECU 40 performs predetermined engine control such as fuel injection control and ignition control by driving the above described various actuators based on the outputs of the above described sensors and predetermined programs. The ECU 40 also has a function of synchronizing an output signal of the in-cylinder pressure sensor 34 with the crank angle, and subjecting the synchronized signal to analog-digital (AD) conversion and acquiring the resulting signal. It is thereby possible to detect an in-cylinder pressure at an arbitrary crank angle timing in a range allowed by the AD conversion resolution. In addition, the ECU 40 has a function of calculating, in accordance with the crank angle, a value of an in-cylinder volume that depends on the crank angle position.

[Method Utilizing in-Cylinder Pressure Sensor for Detecting Combustion Status at Retarded Combustion]

A method for detecting a combustion status of the present embodiment described hereunder is a method that, as illustrated, for example, in FIG. 3A described later, detects a combustion status with respect to a combustion form in which combustion starts (i.e. a heat release amount Q starts to increase from zero) at a timing on a retarded side relative to the compression top dead center (hereunder, may also be referred to simply as "TDC"). Hereunder, combustion performed at a timing retarded relative to normal combustion (defined later) in the aforementioned way is referred to as "retarded combustion". More specifically, since the detection method of the present embodiment can also be applied to an example where the compression top dead center exactly matches the combustion start point, it can be said that an object for application of the detection method of the present embodiment is a case where combustion starts at or after the compression top dead center.

(Absolute Pressure Correction of Output Value of in-Cylinder Pressure Sensor)

In general, the output of an in-cylinder pressure sensor is used with absolute pressure correction to cancel an offset deviation included in the original output value. For example, a method that utilizes the following equation (1) is known as a method for performing this kind of absolute pressure correction. This method utilizes Poisson's equation ($PV^κ$=constant) that holds during a compression stroke that is regarded as an adiabatic process (more specifically, a period from the closing timing of the intake valve 24 to the start of combustion) to calculate an absolute pressure correction value ΔP using an in-cylinder pressure P and an in-cylinder volume V at each of two points during the adiabatic compression stroke and the ratio of specific heat κ.

[Expression 1]

$$\Delta P = \frac{PV^κ(\theta) - PV^κ(\theta - \Delta\theta)}{V^κ(\theta) - V^κ(\theta - \Delta\theta)} \quad (1)$$

Where, in the above equation (1), θ represents a predetermined crank angle in the adiabatic compression stroke, and Δθ represents a predetermined crank angle interval with respect to two crank angles that are used to perform the absolute pressure correction.

In the internal combustion engine 10, the absolute pressure correction for output values of the in-cylinder pressure sensor 34 using the above equation (1) is executed for each cycle in each cylinder equipped with the in-cylinder pressure sensor 34 (in an example of the internal combustion engine 10 of the present embodiment, in all the cylinders). More specifically, in each cycle, the output signal of the in-cylinder pressure sensor 34 is acquired by AD conversion in synchronization with a crank angle θ, and thereby in-cylinder pressure data during a predetermined period that includes a combustion period (for example, a compression stroke and an expansion stroke) is acquired and stored in a buffer of the ECU 40. The absolute pressure correction is then executed using the two crank angles in the adiabatic compression stroke in the in-cylinder pressure data that has been acquired, and in-cylinder pressure data after the absolute pressure correction is stored in the buffer again. Next, various kinds of combustion analysis values (for example, heat release amount Q, mass fraction burned MFB, combustion center CA50 (crank angle at which mass fraction burned MFB is 50%), and indicated torque) in the current cycle are calculated using the in-cylinder pressure data after the absolute pressure correction, and the various kinds of calculated combustion analysis values or a determination result based thereon (for example, a determination result with respect to the existence or non-existence of pre-ignition and misfiring) are fed back to combustion control in the next cycle.

FIGS. 2A and 2B are views for describing an issue relating to absolute pressure correction of an output value of an in-cylinder pressure sensor.

FIG. 2A illustrates data of heat release amount Q in a plurality of cycles that is calculated using in-cylinder pressure data where absolute pressure correction is correctly performed. The in-cylinder heat release amount Q can be calculated according to the following equation (2).

[Expression 2]

$$Q = \int PdV + \frac{1}{\kappa - 1}(PV - P_0V_0) \quad (2)$$

Where, in the above equation (2), $P_0$ and $V_0$ represent an in-cylinder pressure and an in-cylinder volume, respectively, at a calculation start point $\theta_0$ (which is a predetermined crank angle during a compression stroke (however, at a position after closing of the intake valve 24) advanced so as to have a margin with respect to assumed combustion start points). The same applies with respect to equations (3) and (4) described later.

If the above described absolute pressure correction is not correctly performed (that is, if a deviation amount (noise component superimposed on the outputs of the in-cylinder pressure sensor 34) $e_p$ that has not been completely cancelled by the absolute pressure correction remains in the in-cylinder pressure P after the correction), a deviation amount $e_Q$ is included in the heat release amount Q that is calculated according to equation (2) using the output value of the in-cylinder pressure sensor 34. Consequently, as shown in FIG. 2B, a waveform of the heat release amount Q (that is, Q+$e_Q$) in this situation is accompanied by a variation relative to a normal waveform shown in FIG. 2A. Therefore, it is hard to correctly calculate combustion analysis values such as the combustion center CA50 and the maximum heat release amount Qmax. Consequently, there is a possibility that ascertainment of the combustion status such as detection of pre-ignition utilizing the calculated heat release amount Q will not be performed accurately. Note that, hereunder in the present description, to distinguish from a heat release amount (referred to as "actual heat release amount") Qt that is finally estimated by characteristic processing of the present embodiment described later, a heat release amount Q calculated using an output value (after absolute pressure correction) of the in-cylinder pressure sensor 34 is referred to as "calculated heat release amount".

FIGS. 3A and 3B are views that illustrate the respective relations of the heat release amount Q and the in-cylinder volume V with respect to the crank angle θ. FIG. 3A illustrates a waveform of the heat release amount Q at a time of retarded combustion. This is a waveform obtained when absolute pressure correction is correctly performed, that is, when the deviation amount $e_p$ does not remain in the in-cylinder pressure P after absolute pressure correction.

It is assumed herein that the internal combustion engine 10 of the present embodiment is equipped with a piston-crank mechanism that is configured so that a rotation center of the crankshaft 16 and an axial center of a piston pin 13 are both on a cylinder rotation axis, and an offset crank described later is not adopted. If this configuration is adopted, the waveform of the in-cylinder volume V becomes symmetrical about the position of the compression top dead center as shown in FIG. 3B. Accordingly, values of the in-cylinder volume V at a pair of crank angles ($\theta_1$ and $\theta_2$) that are at equal distances from the compression top dead center are equal.

(Influence of Deviation Amount $e_p$ of in-Cylinder Pressure P on Calculation of Heat Release Amount Q)

FIGS. 4A through 4C are views that illustrate the respective relations of the calculated heat release amount Q, the amount of heat release amount variation ΔQ and the deviation amount $e_Q$ with respect to the crank angle θ. FIG. 5 is a view that illustrates waveforms of the deviation amount $e_Q$ of the calculated heat release amount Q.

The deviation amount $e_Q$ of the calculated heat release amount Q when the deviation amount $e_p$ is included in the in-cylinder pressure P after absolute pressure correction can be expressed as shown in the following equation (3) by extracting only the deviation amount $e_p$ term from an equation obtained by substituting (P+$e_p$) and ($P_0$+$e_p$) for the in-cylinder pressures P and $P_0$ in the above described equation (2).

[Expression 3]

$$\begin{aligned} e_Q &= \int e_p dV + \frac{1}{\kappa - 1}(e_p V - e_p V_0) \\ &= e_p\left(\frac{\kappa}{\kappa - 1}(V - V_0)\right) \end{aligned} \quad (3)$$

Based on the above equation (3) it is found that $e_Q$ is a value that depends on the in-cylinder volume V. That is, where the deviation amount $e_p$ of the in-cylinder pressure P is a positive value, as shown in FIG. 4C, the waveform of the deviation amount $e_Q$ with respect to the crank angle θ exhibits a minimum value at the compression top dead center, similarly to the waveform of the in-cylinder volume V shown in FIG. 3B. More specifically, when respective waveforms of the deviation amount $e_Q$ of the heat release amount Q with respect to situations in which the deviation amount $e_p$ takes various positive and negative values are represented in a superimposed manner, the result is as shown in FIG. 5. That is, when the deviation amount $e_p$ is positive, the value of the deviation amount $e_Q$ at TDC increases on the negative side as the deviation amount $e_p$ increases. Conversely, when the deviation amount $e_p$ is negative, the deviation amount $e_Q$ has a waveform that exhibits a maximum value at TDC (a waveform equivalent to a waveform obtained by inverting the waveform of the in-cylinder volume V in the vertical direction), and the value of the deviation amount $e_Q$ at the compression TDC increases on the positive side as the deviation amount $e_p$ increases on the negative side. Note that the waveform illustrated in FIG. 5 corresponds to a waveform obtained by subtracting a waveform of the calculated heat release amount Q that does not include the deviation amount $e_Q$ (see FIG. 2A) from a waveform of the calculated heat release amount Q that includes the deviation amount $e_Q$ (see FIG. 2B). Further, FIG. 5 shows a waveform obtained when the heat release amount Q is calculated taking 90° CA before the compression top dead center as the calculation start point in the internal combustion engine 10 equipped with the aforementioned piston-crank mechanism in which an offset crank is not adopted.

(Calculation of Amount of Heat Release Amount Variation ΔQ)

The waveform of the calculated heat release amount Q that includes the deviation amount $e_Q$ shown in FIG. 4C is shown by a solid line in FIG. 4A, and a difference between this waveform and a waveform shown by a dashed line in the same drawing corresponds to the deviation amount $e_Q$. As illustrated in FIG. 4C and FIG. 5, the deviation amount $e_Q$ is bilaterally symmetrical about TDC. Here, a heat release amount Q that is calculated at a first crank angle $\theta_1(k)$ on the advanced side relative to TDC is taken as a first calculated heat release amount $Q_1(k)$, and a heat release amount Q that is calculated at a second crank angle $\theta_2(k)$ that is a crank angle on the retarded side relative to TDC and is a crank angle at which an in-cylinder volume $V_2$ is the same as an in-cylinder volume $V_1$ at the first crank angle $\theta_1(k)$ is obtained is taken as a second calculated heat release amount $Q_2(k)$, according to an amount of heat release amount variation ΔQ(k) that is the difference between the first calculated heat release amount $Q_1(k)$ and the second calculated heat release amount $Q_2(k)$ (more specifically, is a value obtained by subtracting the first calculated heat release amount $Q_1(k)$ from the second calculated heat release amount $Q_2(k)$), the respective deviation amounts $e_Q$ of the calculated heat release amounts $Q_1(k)$ and $Q_2(k)$ are cancelled. That is, the amount of heat release amount variation ΔQ(k) is not influenced by the deviation amount $e_p$ (error of the absolute pressure correction) of the in-cylinder pressure P. Next, this fact will also be clarified in terms of calculation formulas referring to equations (4) and (5). Note that, when the suffix k is added to a value, it indicates that the value is the $k^{th}$ value for the amount of heat release amount variation ΔQ that is sequentially calculated taking the compression top dead center as a basis (i.e. taking the value ΔQ(0) at the compression top dead center as zero) while retarding the second crank angle $\theta_2$ at predetermined crank angle intervals D and while advancing the first crank angle $\theta_1$ at the predetermined crank angle intervals D. Values to which the suffix k is not added represent general values that are not individuated according to the acquisition timing.

The amount of heat release amount variation ΔQ can be expanded and expressed as shown in equation (4). Further, by extracting only terms relating to the deviation amount $e_p$ from an equation obtained by substituting ($P_1+e_p$) and ($P_2+e_p$) for the in-cylinder pressures $P_1$ and $P_2$ in equation (4), a deviation amount $e_{\Delta Q}$ that corresponds to an amount that is due to the influence of the deviation amount $e_p$ included in the amount of heat release amount variation ΔQ can be represented as shown in the following equation (5).

[Expression 4]

$$\Delta Q = Q_2 - Q_1 \quad (5)$$
$$= \int_{\theta_0}^{\theta_2} P dV + \frac{1}{\kappa - 1}(P_2 V_2 - P_0 V_0) -$$
$$\int_{\theta_0}^{\theta_1} P dV - \frac{1}{\kappa - 1}(P_1 V_1 - P_0 V_0)$$
$$= \int_{\theta_0}^{\theta_2} P dV + \frac{1}{\kappa - 1}(P_2 V_2 - P_1 V_1)$$
$$= \frac{1}{\kappa - 1}(P_2 V_2 - P_1 V_1)$$

$$e_{\Delta Q} = e_P \left(\frac{\kappa}{\kappa - 1}(V_2 - V_1)\right)$$

Based on the above equation (5), if the calculated heat release amounts $Q_1$ and $Q_2$ at a pair of crank angles $\theta_1$ and $\theta_2$ at which $V_2$ and $V_1$ are equal and which have TDC therebetween are selected and the amount of heat release amount variation ΔQ is calculated, the deviation amount $e_{\Delta Q}$ will be zero. Thus, based on equations (4) and (5) also, it is found that the amount of heat release amount variation ΔQ that is calculated as a result of the aforementioned selection is not influenced by the deviation amount $e_p$ of the in-cylinder pressure P. Note that, according to the configuration of the internal combustion engine 10 that does not adopt an offset crank, selection of a pair of crank angles that are at equal distances from TDC, when calculating ΔQ, has the same meaning as selecting a pair of crank angle at which $V_2$ and $V_1$ are equal and which have TDC therebetween.

The waveform shown in FIG. 4B is obtained by utilizing the waveform of the heat release amount Q shown by the solid line in FIG. 4A (that is, a waveform of the calculated heat release amount Q that is after absolute pressure correction and that may include the deviation amount $e_Q$) to consecutively calculate the amount of heat release amount variation ΔQ(k) that is defined as described above for each predetermined crank angle interval D by taking TDC as a reference (k=0), and by associating, with the second crank angle $\theta_2(k)$, the amount of heat release amount variation ΔQ(k) that is sequentially obtained.

More specifically, because the pair of crank angles $\theta_1(k)$ and $\theta_2(k)$ are set by taking TDC as a reference (the origin), the amount of heat release amount variation ΔQ(0) at TDC is zero. Further, if it is assumed that the second crank angle $\theta_2(1)$ is a point that is retarded by the amount of the predetermined crank angle interval D from TDC, according to the calculation rule for the amount of heat release amount variation ΔQ(k) of the present embodiment, the first crank angle $\theta_1(1)$ is a point that is advanced by the same interval D from TDC. Thus, the amount of heat release amount variation ΔQ(1) is a value obtained by subtracting the first calculated heat release amount $Q_1(1)$ at $\theta_1(1)$ from the second calculated heat release amount $Q_2(1)$ at $\theta_2(1)$, and this value ΔQ(1) is taken as the amount of heat release amount variation at $\theta_2(1)$. Similarly, the point $\theta_2(2)$ that is the calculation point adjacent to $\theta_2(1)$ is a point that is further retarded by the amount of the predetermined crank angle interval D from $\theta_2(1)$, and in accompaniment therewith, the corresponding $\theta_1(2)$ is a point that is further advanced by the amount of the predetermined crank angle interval D from $\theta_1(1)$. Accordingly, the amount of heat release amount variation $\Delta Q(2)$ is a value that is obtained by subtracting the first calculated heat release amount $Q_1(2)$ at $\theta_1(2)$ from the second calculated heat release amount $Q_2(2)$ at $\theta_2(2)$, and this value $\Delta Q(2)$ is taken as the amount of heat release amount variation at $\theta_2(2)$. Calculation of the amount of heat release amount variation $\Delta Q(k)$ by this procedure is repeatedly performed for each predetermined crank angle interval D until reaching a predetermined crank angle ($\theta_2(n)$ in the example in FIGS. 4A through 4C) at which it is possible to determine completion of combustion with a predetermined margin in crank angle. Furthermore, by associating the calculated data of $\Delta Q(k)$ with $\theta_2(k)$, data (a waveform) for the amount of heat release amount variation $\Delta Q$ that is synchronized with the crank angle as shown in FIG. 4B is obtained. Note that, with respect to the calculation points that are indicated in FIGS. 4A and 4B such as $\theta_1(k)$ and $Q_1(k)$, from the viewpoint of conceptually describing the procedures for calculating $\Delta Q$, calculation points are sketchily represented with an interval therebetween that is greater than in actuality.

(Method for Acquiring Qt (Including Qtmax) at Retarded Combustion)

As described above, the amount of heat release amount variation $\Delta Q$ in the present embodiment is calculated as a difference ($Q_2(k)-Q_1(k)$) between a first calculated heat release amount $Q_1(k)$ at a first crank angle $\theta_1(k)$ on an advanced side relative to TDC and a second calculated heat release amount $Q_2(k)$ at a second crank angle $\theta_2(k)$ that is on a retarded side relative to TDC and is a crank angle at which an in-cylinder volume $V_2$ is obtained that is the same as an in-cylinder volume $V_1$ at the first crank angle $\theta_1(k)$. According to this calculation method, if the value of the first calculated heat release amount $Q_1$ that is used for calculation of the amount of heat release amount variation $\Delta Q$ is zero, based on equation (4), the value of the second calculated heat release amount $Q_2$ will be equal to the amount of heat release amount variation $\Delta Q$. If so, it is possible to use the value of the amount of heat release amount variation $\Delta Q$ as an estimated value of the final actual heat release amount Qt.

At a time of retarded combustion as defined in the present embodiment, since a combustion start point CA0 (point at which the heat release amount Q starts to increase from zero) is at or after the compression top dead center, the first crank angle $\theta_1$ is always on the advanced side relative to the combustion start point. Therefore, values of all the first calculated heat release amount $Q_1(k)$ that are used for calculating the amount of heat release amount variation $\Delta Q(k)$ become zero when the deviation amount $e_Q$ is removed therefrom. As described in the foregoing, an amount corresponding to the deviation amount $e_Q$ that is superimposed on the calculated heat release amounts $Q_1(k)$ and $Q_2(k)$ can be cancelled by calculating the amount of heat release amount variation $\Delta Q(k)$. Accordingly, it can be said that, at a time of retarded combustion, the waveform of the amount of heat release amount variation $\Delta Q(k)$ becomes equal to the waveform of the second calculated heat release amount $Q_2(k)$ after an amount corresponding to the deviation amount $e_Q$ is removed therefrom. Therefore, as will be understood by comparing FIGS. 4A and 4B, at a time of retarded combustion, by setting the calculation range of the amount of heat release amount variation $\Delta Q$ so that a crank angle (corresponds to $\theta_2(n)$ in the example in FIGS. 4A through 4C) that is on the retarded side relative to a combustion end point CA100 (point at which the heat release amount Q reaches a maximum value) is used as the second crank angle $\theta_2(k)$, a waveform that is equivalent to a waveform of the heat release amount Q shown by a dashed line in FIG. 4A (waveform where absolute pressure correction is correctly performed) is obtained in a state where the crank angles $\theta$ on the horizontal axis match the waveform of the heat release amount Q. Thus, the maximum value $\Delta$Qmax of the amount of heat release amount variation $\Delta Q$ can be estimated as a maximum actual heat release amount Qtmax. Further, by multiplying the maximum value $\Delta$Qmax of $\Delta Q$ by $\alpha/100$, it is possible to estimate not only the maximum actual heat release amount Qtmax, but also to calculate an estimated value of the actual heat release amount Qt where MFB reaches a predetermined fraction $\alpha$(%).

FIG. 6 is a view that illustrates waveforms of the amount of heat release amount variation $\Delta Q$ calculated based on the calculated heat release amount Q (including the deviation amount $e_Q$) shown in FIG. 2B. As will also be understood from the waveforms shown in FIG. 6, according to the amount of heat release amount variation $\Delta Q$ that is based on the calculation method of the present embodiment, with regard to a combustion period that exists from TDC onward, waveforms are obtained that are equivalent to the waveforms in FIG. 2A which represent the calculated heat release amount Q where absolute pressure correction is correctly performed.

As described in the foregoing, the amount of heat release amount variation $\Delta Q$ that is calculated according to the above described calculation rule is not influenced by the deviation amount $e_p$ (error of absolute pressure correction) of the in-cylinder pressure P. Therefore, by utilizing the amount of heat release amount variation $\Delta Q$, even if absolute pressure correction has not been performed correctly (even if the deviation amount $e_Q$ is included in the calculated heat release amount Q), the influence of the deviation amount $e_p$ can be eliminated and the actual heat release amount Qt can be precisely estimated.

(Method for Acquiring CA$\alpha$ (Including CA50) at Retarded Combustion)

In addition, by utilizing data of amount of heat release amount variation $\Delta Q$ that is synchronized with the crank angle and is obtained as described above, a crank angle CA$\alpha$ (for example, CA50 as the combustion center) at which MFB reaches a predetermined fraction $\alpha$ can be precisely acquired without being affected by the deviation amount $e_p$ (error of the absolute pressure correction) of the in-cylinder pressure P. More specifically, a point at which $\Delta Q$ starts to increase from zero is regarded as the combustion start point (CA0), and a point at which $\Delta Q$ reaches the maximum value $\Delta$Qmax is regarded as the combustion end point (CA100). As a result, MFB at an arbitrary crank angle $\theta$ can be calculated according to the following equation (6) using $\Delta$Qmax that is $\Delta Q$ ($\theta_{CA100}$), and an arbitrary $\Delta Q$. Accordingly, by utilizing equation (6), CA$\alpha$ when MFB becomes an arbitrary fraction can be calculated. Note that, the reason why the equation can be simplified as shown in equation (6) is that $\Delta Q_{CA0}$ (=$Q_{2CA0}$ without the deviation amount $e_Q$) becomes zero.

[Expression 5]

$$MFB = \frac{\Delta Q(\theta) - \Delta Q(\theta_{CA0})}{\Delta Q(\theta_{CA100}) - \Delta Q(\theta_{CA0})} = \frac{\Delta Q(\theta)}{\Delta Q(\theta_{CA100})} \quad (6)$$

(Specific Processing Relating to Detection of Combustion Status in Embodiment 1)

FIG. 7 is a flowchart illustrating a routine that the ECU 40 executes to realize a method for detecting the combustion status at a time of retarded combustion in Embodiment 1 of the present invention. Note that the present routine is repeatedly executed for each cycle at a predetermined timing after combustion ends in each cylinder. Further, in the present routine, the maximum actual heat release amount Qtmax is shown as an example of the actual heat release amount Qt that is acquired utilizing the amount of heat release amount variation ΔQ, and CA50 is shown as an example of CAα that is acquired utilizing the amount of heat release amount variation ΔQ.

In the routine illustrated in FIG. 7, first, utilizing the in-cylinder pressure sensor 34 and the crank angle sensor 42, the ECU 40 acquires in-cylinder pressure data in synchronization with the crank angle for the current cycle (step 100). Next, the ECU 40 utilizes the acquired in-cylinder pressure data and the above described equation (2) to calculate data of the heat release amount (calculated heat release amount) Q in synchronization with the crank angle in a predetermined period (step 102). The period for calculating the data of the calculated heat release amount Q is a crank angle period from the aforementioned predetermined calculation start point $\theta_0$ until a predetermined calculation end point (that is, a crank angle period which is assumed in advance to be a crank angle period that includes the combustion period). The calculation end point is a predetermined crank angle during an expansion stroke (however, prior to opening of the exhaust valve 26) retarded so as to have a margin with respect to assumed combustion end points.

Next, the ECU 40 uses the data of the calculated heat release amount Q obtained by the processing in step 102 to calculate data of amount of heat release amount variation ΔQ in synchronization with the crank angle in accordance with the above described calculation rule (step 104). The period for calculating the ΔQ data may be any period that satisfies the condition that a crank angle that is on the advanced side relative to the combustion start point and is during the compression stroke (however, is after closing of the intake valve 24) is used as the first crank angle $\theta_1$, and a crank angle that is on the retarded side relative to the combustion end point and is during the expansion stroke (however, is before opening of the exhaust valve 26) is used as the second crank angle $\theta_2$. For example, a period exemplified with reference to FIGS. 4A through 4C can be used as the aforementioned period.

Next, the ECU 40 acquires the maximum value ΔQmax of the data of amount of heat release amount variation ΔQ acquired in step 104, as the maximum actual heat release amount Qtmax (step 106). Further, utilizing the acquired data of amount of heat release amount variation ΔQ and equation (6), the ECU 40 acquires the crank angle CA50 at the combustion center (step 108).

(Example of Utilization of Amount of Heat Release Amount Variation ΔQ)

By calculating various combustion analysis values utilizing the amount of heat release amount variation ΔQ, combustion analysis can be performed without being affected by the deviation amount $e_p$ of the in-cylinder pressure P. Here, detection of the occurrence of pre-ignition and detection of misfiring will be described as concrete examples of utilization of the amount of heat release amount variation ΔQ.

FIG. 8 is a flowchart illustrating a pre-ignition detection processing routine that utilizes CA50 acquired using the amount of heat release amount variation ΔQ. The processing of the present routine is executed in conjunction with the routine shown in FIG. 7.

In the routine shown in FIG. 8, first, the ECU 40 determines whether or not CA50 obtained based on the amount of heat release amount variation ΔQ is at a timing on the advanced side relative to a predetermined first determination value (step 200). If pre-ignition occurs, CA50 advances in comparison to a time that pre-ignition does not occur. The first determination value used in step 200 is a value that is previously set as a threshold value for determining the presence or absence of advancement of CA50 accompanying occurrence of pre-ignition.

If the result determined in step 200 is negative, the ECU 40 determines that pre-ignition has not occurred in the current cycle (step 202). On the other hand, if the result determined in step 200 is affirmative, the ECU 40 determines that pre-ignition has occurred in the current cycle (step 204).

According to the above described routine illustrated in FIG. 8, by utilizing CA50 that is based on the amount of heat release amount variation ΔQ, the occurrence of pre-ignition can be precisely detected without being affected by the deviation amount $e_p$ of the in-cylinder pressure P.

FIG. 9 is a flowchart illustrating a misfiring detection processing routine that utilizes the maximum actual heat release amount Qtmax acquired using the amount of heat release amount variation ΔQ. The processing of the present routine is executed in conjunction with the routine shown in FIG. 7.

In the routine shown in FIG. 9, first the ECU 40 determines whether or not the maximum actual heat release amount Qtmax that is based on the amount of heat release amount variation ΔQ is less than a predetermined second determination value (step 300). If misfiring occurs, heat release does not occur in the cylinder, or the amount of heat release does not come close to reaching the heat release amount Q for a time of normal ignition even if a small amount of heat release occurs. The second determination value used in step 300 is previously set as a threshold value for determining the existence/non-existence of a change in the maximum actual heat release amount Qtmax accompanying the occurrence of misfiring.

If the result of the determination in step 300 is negative, the ECU 40 determines that misfiring has not occurred in the current cycle (step 302). On the other hand, if the result of the determination in step 300 is affirmative, the ECU 40 determines that misfiring has occurred in the current cycle (step 304).

According to the above described routine shown in FIG. 9, by utilizing the maximum actual heat release amount Qtmax based on the amount of heat release amount variation ΔQ, the occurrence of misfiring can be precisely detected without being affected by the deviation amount $e_p$ of the in-cylinder pressure P.

In the above described Embodiment 1, CA50 is utilized for detecting pre-ignition. However, a predetermined fraction combustion point that is used for determining the occurrence/non-occurrence of pre-ignition in the present invention is not limited to CA50, and may be a combustion point (CAα) of another arbitrary fraction.

Note that, in the above described Embodiment 1, "crank angle acquisition means" according to the first aspect of the present invention is realized by the ECU 40 acquiring the crank angle θ using the crank angle sensor 42, "heat release amount calculation means" according to the first aspect of the present invention is realized by the ECU 40 executing the processing in step 102, and "actual heat release amount estimation means" according to the first aspect of the present invention is realized by the ECU 40 executing the processing in step 106. Further, in Embodiment 1, "heat release amount variation calculation means" according to the second and fifth aspects of the present invention is realized by the ECU 40 executing the processing in the above described step 104. In addition, in Embodiment 1, CAα corresponds to "predetermined fraction combustion point" according to the fifth aspect of the present invention, $\theta_{2CA100}$ that is the second crank angle when ΔQ reaches the maximum value ΔQmax corresponds to "heat-release-amount-variation maximum crank angle" according to the fifth aspect of the present invention, and a 50% combustion point $\theta_{2CA50}$ when MFB reaches 50% corresponds to "specified second crank angle" according to the fifth aspect of the present invention. Moreover, "second combustion point acquisition means" according to the third aspect of the present invention is realized by the ECU 40 executing the processing in step 108. Furthermore, in Embodiment 1, "pre-ignition determination means" according to the ninth aspect of the present invention is realized by the ECU 40 executing the series of processing illustrated in FIG. 8, and "misfiring determination means" according to the tenth aspect of the present invention is realized by the ECU 40 executing the series of processing illustrated in FIG. 9.

Embodiment 2

Next, Embodiment 2 of the present invention will be described referring to FIG. 10A through FIG. 12.

The system of the present embodiment can be realized by using the hardware configuration shown in FIG. 1, and causing the ECU 40 to execute a routine shown in FIG. 12, described later, instead of the routine shown in FIG. 7.

[Method Utilizing in-Cylinder Pressure Sensor for Detecting Combustion Status at Normal Combustion]

The combustion status detection method of the present embodiment described hereunder takes a time of normal combustion as an object. At a time of normal combustion, as shown in FIG. 10A described later, heat release inside a cylinder that accompanies combustion starts at a timing that is slightly on the advanced side relative to the compression top dead center, and reaches a 50% combustion point (CA50) at around 8° CA after the compression top dead center. In the present description, to clearly distinguish the following normal combustion from retarded combustion described above and advanced combustion described later, the term "normal combustion" used herein refers to a combustion form where combustion is performed in a manner that extends across the compression top dead center, that is, combustion (heat release) starts at a timing on the advanced side relative to the compression top dead center, and the combustion end point is a timing on the retarded side relative to the compression top dead center.

(Reason it is not Suitable to Utilize ΔQ for Acquisition of CAα)

At a time of normal combustion that is the object of the present embodiment, one part of the combustion period exists in a crank angle period on the advanced side relative to the compression top dead center. For the reason described hereunder, it is not preferable to treat the amount of heat release amount variation ΔQ at a time of normal combustion in the same manner as at a time of retarded combustion described in Embodiment 1.

FIGS. 10A and 10B and FIGS. 11A and 11B are views that represent the relation between each of the calculated heat release amount Q and the amount of heat release amount variation ΔQ, and the crank angle θ at a time of normal combustion. More specifically, FIGS. 10A and 10B illustrate an example in which CA50 is at a timing on the retarded side relative to TDC (an example where the heat release amount Q extends across TDC at a timing on the advanced side relative to CA50). On the other hand, FIGS. 11A and 11B illustrate an example in which CA50 is at a timing on the advanced side relative to TDC (an example where the heat release amount Q extends across TDC at a timing on the retarded side relative to CA50). According to the above described definition, the example illustrated in FIGS. 11A and 11B is also treated as a time of normal combustion. Note that, in FIGS. 10A and 10B and FIGS. 11A and 11B, as a waveform of the calculated heat release amount Q, for convenience, a waveform is used in which the deviation amount $e_Q$ is not reflected, and further, data of amount of heat release amount variation ΔQ is associated with the second crank angle $\theta_2$, similarly to Embodiment 1.

As shown in FIG. 10B and FIG. 11B, at a time of normal combustion, a break point arises in the waveform of the amount of heat release amount variation ΔQ. The reason is as follows. That is, when calculating ΔQ(k) with the second calculated heat release amount $Q_2(k)$ and the first calculated heat release amount $Q_1(k)$ that serves to form a pair therewith, as described in the foregoing, $Q_1(k)$ will always be zero if the calculation is for a time of retarded combustion. In contrast, at a time of normal combustion, because one part of the combustion period exists on the advanced side relative to TDC, a period exists in which $Q_1(k)$ does not become zero. In the example illustrated in FIGS. 10A and 10B, the first calculated heat release amount $Q_1(k)$ in the period from CA0 to TDC exhibits a positive value, and not zero. Accordingly, a slope of ΔQ(k) that is calculated using $Q_1(k)$ in the aforementioned period and $Q_2(k)$ within a period X corresponding to the aforementioned period becomes steeper than a slope of ΔQ(k) in a period Y in which $Q_1(k)$ becomes zero because $Q_1(k)$ in the period Y is a value at the first crank angle $\theta_1(k)$ on the advanced side relative to CA0. Consequently, at a time of normal combustion, a break point arises in the waveform of the amount of heat release amount variation ΔQ. As a result, the waveform of the amount of heat release amount variation ΔQ at a time of normal combustion differs from that at a time of retarded combustion and also from that at a time of advanced combustion described later (see FIGS. 13A and 13B), and is separated from the waveform of the correct heat release amount Q (waveform that does not include the deviation amount $e_Q$). More specifically, the slope of the calculated heat release amount Q during a combustion period and the slope of ΔQ are different. Therefore, at a time of normal combustion, it is difficult to precisely acquire, using the data of ΔQ, the crank angle CAα at which MFB reaches a predetermined fraction α.

(Characteristics of Waveform of ΔQ at Normal Combustion)

As shown in FIGS. 10A and 10B and FIGS. 11A and 11B, even in an example where CA50 is at a timing on the retarded side relative to TDC or an example where CA50 is at a timing on the advanced side relative to TDC, the waveforms of the amount of heat release amount variation ΔQ at a time of normal combustion are similar. Further, concerning information obtained based on the amount of heat release amount variation ΔQ, the following difference exists between these two examples. That is, in the example illustrated in FIGS. 10A and 10B, it can be said that a change that occurs in the value of ΔQ at a point Z is caused by the fact that the calculated heat release amount Q reaches a maximum value at the second crank angle $\theta_{2Z}$ used for calculating ΔQ at the point Z. That is, with regard to the example illustrated in FIGS. 10A and 10B, it can be said that ΔQ at the point Z captures a change at CA100. Accordingly, it can be determined that the second crank angle $\theta_{2Z}$ is CA100. On the other hand, in the example illustrated in FIGS. 11A and 11B, it can be said that a change that occurs in the value of ΔQ at the point Z is caused by the fact that the calculated heat release amount Q begins to increase from zero at the first crank angle $\theta_{1Z}$ used for calculating ΔQ at the point Z. That is, with regard to the example illustrated in FIGS. 11A and 11B, it can be said that ΔQ at the point Z captures a change at CA0. Accordingly, it can be determined that the first crank angle $\theta_{1Z}$ that forms a pair with the second crank angle $\theta_{2Z}$ at the point Z, that is, $\theta_{1Z}$ which is at the same distance from TDC as $\theta_{2Z}$ with TDC positioned therebetween (the respective in-cylinder volumes V are the same), is CA0. As described above, when the above described two examples are assumed, it can be said that the point Z that is a point of inflection of ΔQ is a point at which the influence of the crank angle θ which is farther from TDC among CA100 and CA0 is reflected.

At a time point at which data of amount of heat release amount variation ΔQ is acquired based on data of the calculated heat release amount Q during operation of the internal combustion engine 10, it is not yet known which example the waveform of the calculated heat release amount Q corresponds to among the example illustrated in FIGS. 10A and 10B and the example illustrated in FIGS. 11A and 11B. However, with regard to both the example in FIGS. 10A and 10B and the example in FIGS. 11A and 11B, it can be said that a combustion period (from true CA0 to true CA100) exists during a crank angle period $(\theta_{2Z}-\theta_{1Z})$ that is defined by the second crank angle $\theta_{2Z}$ at the point Z that is the point of inflection of ΔQ at which ΔQ reaches a maximum value and the first crank angle $\theta_{1Z}$ that forms a pair with $\theta_{2Z}$. Further, it can be said that the crank angle period $(\theta_{2Z}-\theta_{1Z})$ is a period that is sufficiently near to TDC. As shown in FIG. 5, since an influence according to a change in the in-cylinder volume V is manifested to the deviation amount $e_Q$ of the calculated heat release amount Q produced due to the deviation amount $e_p$ of the in-cylinder pressure P, a change in the deviation amount $e_Q$ with respect to a change in the crank angle θ decreases in the vicinity of TDC. Accordingly, in the vicinity of TDC, the waveform of the deviation amount $e_Q$ is flat. Thus, it can be said that in a period in the vicinity of TDC, such as the crank angle period $(\theta_{2Z}-\theta_{1Z})$, in comparison to a period that is further away from TDC than the aforementioned period, the influence of the deviation amount $e_Q$ on the calculated heat release amount Q is relatively small.

(Method for Acquiring Qt (Including Qtmax) at Normal Combustion)

At a time of normal combustion also, a calculation period for calculating data of amount of heat release amount variation ΔQ is taken as a period that satisfies the condition that a crank angle that is on the advanced side relative to the combustion start point and is during the compression stroke (however, is after closing of the intake valve 24) is used as the first crank angle $\theta_1$, and a crank angle that is on the retarded side relative to the combustion end point and is during the expansion stroke (however, is before opening of the exhaust valve 26) is used as the second crank angle $\theta_2$. Consequently, similarly to a time of retarded combustion, the maximum value ΔQmax of ΔQ can be estimated as the maximum actual heat release amount Qtmax. Therefore, in the present embodiment also, the estimated value of the maximum actual heat release amount Qtmax is acquired using the maximum value ΔQmax of ΔQ. Further, by multiplying the maximum value ΔQmax of ΔQ by α/100, not only can the maximum actual heat release amount Qtmax be estimated, but it is also possible to calculate an estimated value of the actual heat release amount Qt at which MFB reaches a predetermined fraction α(%).

(Method for Acquiring CAα (Including CA50) at a Time of Normal Combustion)

Furthermore, according to the present embodiment, a crank angle CAα at a time of a predetermined mass fraction burned α is acquired using the following method. That is, the period regarded as a combustion period is the crank angle period $(\theta_{2Z}-\theta_{1Z})$ which is obtained when the second crank angle $\theta_{2Z}$ that is the heat-release-amount-variation maximum crank angle at which ΔQ reaches ΔQmax in the data of ΔQ is regarded as the combustion end point, and when the first crank angle $\theta_{1Z}$ that is a crank angle located on the opposite side to $\theta_{2Z}$ across the compression top dead center and that is a crank angle at which an in-cylinder volume $V_{1Z}$ that is the same as an in-cylinder volume $V_{2Z}$ at $\theta_{2Z}$ is obtained is regarded as the combustion start point. Further, CAα is acquired using data of the calculated heat release amount Q within the deemed combustion period $(\theta_{2Z}-\theta_{1Z})$ that is specified utilizing ΔQmax as described above, and not the data of ΔQ.

With regard to acquisition of CAα at a time of normal combustion, more specifically, MFB is calculated in accordance with the following equation (7) utilizing data of the calculated heat release amount Q within the deemed combustion period $(\theta_{2Z}-\theta_{1Z})$. Further, a crank angle θ at which the calculated MFB reaches a predetermined fraction α is acquired as CAα. Note that, although in the foregoing description an example in which CA50 and TDC exactly match is not indicated, the present calculation method can also be used in such an example.

[Expression 6]

$$MFB = \frac{Q(\theta) - Q(\theta_{CA0})}{Q(\theta_{CA100}) - Q(\theta_{CA0})} \qquad (7)$$

(Specific Processing Relating to Detection of Combustion Status in Embodiment 2)

FIG. 12 is a flowchart illustrating a routine that the ECU 40 executes to realize a detection method for detecting the combustion status during normal combustion in Embodiment 2 of the present invention. In FIG. 12, steps that are the same as steps shown in FIG. 7 in Embodiment 1 are denoted by the same reference numerals as in FIG. 7, and a description thereof is omitted or abbreviated. Further, in the present routine also, the maximum actual heat release amount Qtmax is shown as an example of the actual heat release amount Qt that is acquired utilizing the amount of heat release amount variation ΔQ, and CA50 is shown as an example of CAα that is acquired utilizing the amount of heat release amount variation ΔQ. Further, although omitted here, similarly to Embodiment 1, a configuration may also be adopted in which detection of the occurrence of pre-ignition and detection of misfiring by the routines illustrated in FIGS. 8 and 9 are executed in conjunction with the present routine.

In the routine illustrated in FIG. 12, similarly to the routine illustrated in FIG. 7, after calculating data of amount of heat release amount variation ΔQ that is synchronized with the crank angle in step 104, the ECU 40 acquires the maximum value ΔQmax of the acquired data of amount of heat release amount variation ΔQ as the maximum actual heat release amount Qtmax (step 106).

Next, the ECU 40 acquires the second crank angle $\theta_{2Z}$ at the point Z that is the point of inflection of ΔQ when ΔQ reaches the maximum value ΔQmax (step 400). Thereafter, the ECU 40 acquires, as CA50, a crank angle θ where MFB reaches 50%, using data of the calculated heat release amount Q within the deemed combustion period ($\theta_{2Z}-\theta_{1Z}$) that is defined with the acquired $\theta_{2Z}$ and the first crank angle $\theta_{1Z}$ that forms a pair with $\theta_{2Z}$, and equation (7) (step 402).

According to the above described combustion status detection method, even at a time of normal combustion, by utilizing the maximum value ΔQmax of ΔQ, the maximum actual heat release amount Qtmax can be precisely acquired without being affected by the deviation amount $e_p$ (error of the absolute pressure correction) of the in-cylinder pressure P. In addition, by utilizing the maximum value ΔQmax of ΔQ, an actual heat release amount Qt at an arbitrary MFB other than Qtmax can also be precisely acquired.

Further, according to the above described combustion status detection method, a deemed crank angle period ($\theta_{2Z}-\theta_{1Z}$) that is specified utilizing the maximum value ΔQmax of ΔQ is taken as a combustion period, and CAα (CA50 or the like) during normal combustion is acquired using a value of the calculated heat release amount Q within the crank angle period ($\theta_{2Z}-\theta_{1Z}$) in data of the calculated heat release amount Q. Thus, in the present embodiment, for acquisition of CAα, the amount of heat release amount variation ΔQ is used only to specify the deemed crank angle period ($\theta_{2Z}-\theta_{1Z}$). According to this method, CAα can be precisely acquired while avoiding use of a value of a waveform of the amount of heat release amount variation ΔQ that differs from a waveform (slope) of the calculated heat release amount Q at a time of normal combustion. Also, CAα can be precisely acquired utilizing the calculated heat release amount Q within the deemed crank angle period ($\theta_{2Z}-\theta_{1Z}$) in which the influence of an absolute pressure correction error (amount corresponding to deviation amount $e_Q$) is small because of being in the vicinity of TDC. Further, by using the deemed crank angle period ($\theta_{2Z}-\theta_{1Z}$) that is specified utilizing the maximum value ΔQmax of ΔQ, the range of data of the calculated heat release amount Q that is used when acquiring CAα can be set to a necessary minimum range in which the combustion period is definitely included and which is not affected by the absolute pressure correction error as far as possible.

Note that, in the above described Embodiment 2, CAα corresponds to "predetermined fraction combustion point" according to the third aspect of the present invention, $\theta_{2Z}$ that is the second crank angle obtained when ΔQ reaches the maximum value ΔQmax corresponds to "heat-release-amount-variation maximum crank angle" according to the third aspect of the present invention, and the first crank angle $\theta_{1Z}$ that forms a pair with $\theta_{2Z}$ corresponds to "specified first crank angle" according to the third aspect of the present invention. Further, "heat release amount variation calculation means" according to the third aspect of the present invention is realized by the ECU 40 executing the processing in step 104, and "first combustion point acquisition means" according to the third aspect of the present invention is realized by the ECU 40 executing the processing in steps 400 and 402.

Embodiment 3

Next, Embodiment 3 of the present invention is described referring to FIGS. 13A and 13B and FIG. 14.

The system of the present embodiment can be realized by using the hardware configuration shown in FIG. 1, and causing the ECU 40 to execute a routine shown in FIG. 14 described later, instead of the routine shown in FIG. 7.

[Method Utilizing in-Cylinder Pressure Sensor for Detecting Combustion Status at Advanced Combustion]
(Characteristics of Waveform of ΔQ at Advanced Combustion)

FIGS. 13A and 13B are views that represent the relation between each of the calculated heat release amount Q and the amount of heat release amount variation ΔQ and the crank angle θ at a time of advanced combustion. Note that, in FIGS. 13A and 13B also, as a waveform of the calculated heat release amount Q, for convenience, a waveform is used in which the deviation amount $e_Q$ is not represented, and further, data of amount of heat release amount variation ΔQ is associated with the second crank angle $\theta_2$, similarly to Embodiments 1 and 2.

The combustion status detection method of the present embodiment described hereunder takes as an object a time of advanced combustion (fundamentally, a time at which abnormal combustion such as pre-ignition occurs corresponds thereto) in which combustion is performed at a timing advanced relative to a time of normal combustion defined as described above. That is, the term "advanced combustion" used herein refers to a combustion form in which, as shown in FIG. 13A, heat release inside a cylinder starts accompanying combustion at a timing on the advanced side relative to the compression top dead center, and the combustion ends at a timing at or before the compression top dead center.

If data of amount of heat release amount variation ΔQ(k) (=$Q_2(k)-Q_1(k)$) is calculated according to the calculation rule described above in Embodiment 1 utilizing data of the calculated heat release amount Q at a time of advanced combustion shown in FIG. 13A, as shown in FIG. 13B, similarly to a time of retarded combustion described in Embodiment 1, a waveform of the amount of heat release amount variation ΔQ having an equivalent shape to the waveform of the calculated heat release amount Q can be obtained.

However, although at a time of retarded combustion the waveform of ΔQ can be obtained in a state in which a crank angle position at which MFB reaches the same value matches a waveform of the calculated heat release amount Q, the waveform of ΔQ at a time of advanced combustion appears on the opposite side to the waveform of the calculated heat release amount Q with respect to TDC that is positioned between the two waveforms. Consequently, it is necessary to pay attention to the following points in relation to calculation of CAα at which MFB reaches a predetermined fraction α. That is, taking CA50 shown in FIGS. 13A and 13B as an example for the following description, the first crank angle $\theta_1$ that forms a pair with the second crank angle $\theta_2$ (that is, crank angles at equal distances from TDC which is positioned at the center between the crank angles (in other words, crank angles at which the in-cylinder volume V is the same value)) corresponds to the true CA50, and not a second crank angle $\theta_{2CA50}$ that corresponds to CA50 on the data of ΔQ. This similarly applies with respect to other crank angles CAα. In addition, second crank angles $\theta_{2CA\alpha}$ corresponding to the respective crank angles CAα on the data of ΔQ are present at positions that are inverted about TDC with respect to first crank angles $\theta_{1CA\alpha}$ that correspond to the true values of the respective crank angles CAα. Note that, an example in which it can be said in this way that the second crank angle $\theta_{2CA\alpha}$ is present at an inverted position is limited to an example where a piston-crank mechanism is adopted that is configured so that both the rotation center of the crankshaft 16 and the axial center of the piston pin 13 are on the cylinder rotation axis, as in the internal combustion engine 10. However, irrespective of whether or not an offset crank is used, the second crank angles $\theta_{2CA\alpha}$ corresponding to the respective crank angles CAα on the data of ΔQ can each be present at a position at which the in-cylinder volume V becomes the same as at the first crank angles $\theta_{1CA\alpha}$ that correspond to the true values of the respective crank angles CAα through TDC.

(Method for Acquiring Qt (Including Qtmax) at Advanced Combustion)

At a time of advanced combustion also, a calculation period for calculating data of amount of heat release amount variation ΔQ is taken as a period that satisfies the condition that a crank angle which is on the advanced side relative to the combustion start point and which is during the compression stroke (however, is after closing of the intake valve 24) is used as the first crank angle $\theta_1$, and a crank angle which is on the retarded side relative to the combustion end point and which is during the expansion stroke (however, is before opening of the exhaust valve 26) is used as the second crank angle $\theta_2$. Consequently, similarly to a time of retarded combustion and the like, the maximum value ΔQmax of ΔQ can be estimated as the maximum actual heat release amount Qtmax. Therefore, in the present embodiment also, the estimated value of the maximum actual heat release amount Qtmax is acquired using the maximum value ΔQmax of ΔQ. Further, by multiplying the maximum value ΔQmax of ΔQ by α/100, not only can the maximum actual heat release amount Qtmax be estimated, but it is also possible to calculate an estimated value of the actual heat release amount Qt at which MFB reaches a predetermined fraction α(%).

(Method for Acquiring CAα (Including CA50) at Advanced Combustion)

At a time of advanced combustion, where the amount of heat release amount variation ΔQ(k) is calculated as a difference ($Q_2(k)-Q_1(k)$), and data of ΔQ(k) is obtained in a state in which the data is associated with $\theta_2(k)$, as described above referring to FIG. 13B, second crank angles $\theta_{2CA\alpha}$ corresponding to the respective crank angles CAα on the data of ΔQ are present at positions that is inverted about TDC with respect to the first crank angles $\theta_{1CA\alpha}$ corresponding to the true values of the respective crank angles CAα. Therefore, in the present embodiment, the following method is utilized in regard to acquisition of CAα at an arbitrary MFB.

That is, a second crank angle at which ΔQ reaches the maximum value ΔQmax in the data of ΔQ is regarded as $\theta_{2CA0}$, and a second crank angle when ΔQ starts to increase from zero in the data of ΔQ is regarded as $\theta_{2CA100}$. Further, using $\Delta Q_{CA0}$ (=ΔQmax) at $\theta_{2CA0}$ as a reference, an absolute value ($|\Delta Q_{CA\alpha}-\Delta Q_{CA0}|$) of a difference between $\Delta Q_{CA0}$ and $\Delta Q_{CA\alpha}$ that is a value of ΔQ at the respective second crank angles $\theta_{2CA\alpha}$ that correspond to the respective crank angles CAα in the data of ΔQ is calculated. The estimated value of the actual heat release amount Qt at which MFB reaches a predetermined fraction α is then acquired utilizing the value ($|\Delta Q_{CA\alpha}-\Delta Q_{CA0}|$). In addition, MFB based on the actual heat release amount Qt acquired by this method is calculated by substituting the actual heat release amount Qt for Q(θ) in the above described equation (7), substituting the aforementioned $\Delta Q_{CA0}$ (=ΔQmax=Qtmax) for $Q(\theta_{CA100})$ in the same equation, and substituting zero for $Q(\theta_{CA0})$ in the same equation.

By determining MFB as described above utilizing the data of ΔQ, the second crank angle $\theta_{2CA\alpha}$ corresponding to the calculated MFB can be acquired. Further, the first crank angle $\theta_{1CA\alpha}$ that forms a pair with the acquired second crank angle $\theta_{2CA\alpha}$ is acquired, and the acquired first crank angle $\theta_{1CA\alpha}$ is treated as a true value of CAα. At a time of advanced combustion, by such a method, CAα (for example, CA50) can be acquired utilizing ΔQ.

(Specific Processing Relating to Detection of Combustion Status in Embodiment 3)

FIG. 14 is a flowchart illustrating a routine that the ECU 40 executes to realize a method for detecting the combustion status during advanced combustion in Embodiment 3 of the present invention. In FIG. 14, steps that are the same as steps shown in FIG. 7 in Embodiment 1 are denoted by the same reference numerals as in FIG. 7, and a description thereof is omitted or abbreviated. Further, in the present routine also, Qtmax is shown as an example of acquisition of the actual heat release amount Qt, and CA50 is shown as an example of acquisition of CAα. Further, although omitted here, similarly to Embodiment 1 and the like, a configuration may also be adopted in which detection of the occurrence of pre-ignition and detection of misfiring by the routines illustrated in FIGS. 8 and 9 are executed in conjunction with the present routine.

In the routine illustrated in FIG. 14 also, similarly to the routine illustrated in FIG. 7 and the like, after calculating data of amount of heat release amount variation ΔQ that is synchronized with the crank angle in step 104, the ECU 40 acquires the maximum value ΔQmax of the acquired data of amount of heat release amount variation ΔQ as the maximum actual heat release amount Qtmax (step 106).

Next, the ECU 40 acquires the second crank angle $\theta_{2CA50}$ that corresponds to CA50 with the method of the present embodiment utilizing the acquired data of amount of heat release amount variation ΔQ and equation (7) (step 500). The ECU 40 then acquires a first crank angle $\theta_{1CA50}$ that forms a pair with the acquired second crank angle $\theta_{2CA50}$ as CA50 (step 502).

As described above, at a time of advanced combustion also, since the amount of heat release amount variation ΔQ is utilized, the actual heat release amount Qt (including Qtmax) and CAα (including CA50) can be precisely acquired without being affected by the deviation amount $e_p$ of the in-cylinder pressure P (error of absolute pressure correction).

In the above described Embodiment 3, a configuration is adopted in which the data of amount of heat release amount variation ΔQ that is calculated as a difference ($Q_2-Q_1$) is acquired in association with the second crank angle $\theta_2$. However, with respect to calculation of CAα at an arbitrary MFB at a time of advanced combustion, instead of the above described method, the data of amount of heat release amount variation ΔQ may be acquired in association with the first crank angle $\theta_1$. By using such a method, data of amount of heat release amount variation ΔQ can be acquired in a state in which crank angles θ at which the respective CAα are obtained match a waveform of the calculated heat release amount Q obtained at a time of advanced combustion. Note that, ΔQ obtained when using this method may be calculated as a difference ($Q_2-Q_1$), or may be calculated as a difference ($Q_1-Q_2$). Although ΔQ of a waveform obtained when utilizing the difference ($Q_1-Q_2$) are negative values, a value of MFB at the second crank angle $\theta_{2CA\alpha}$ increases with an increase in ΔQ on the negative side when the crank angle θ changes in such a manner as to increase the heat release amount Q.

Note that, in the above described Embodiment 3, CAα corresponds to "predetermined fraction combustion point" according to the seventh aspect of the present invention, the 50% combustion point $\theta_{2CA50}$ where MFB reaches 50% corresponds to "specified second crank angle" according to the seventh aspect of the present invention, and the first crank angle $\theta_{1CA50}$ that forms a pair with $\theta_{2CA50}$ corresponds to "specified first crank angle" according to the seventh aspect of the present invention. Further, "heat release amount variation calculation means" according to the seventh aspect of the present invention is realized by the ECU 40 executing the processing in step 104, "third combustion point acquisition means" according to the seventh aspect of the present invention is realized by the ECU 40 executing the processing in steps 500 and 502, "specified second crank angle acquisition means" according to the seventh aspect of the present invention is realized by the ECU 40 executing the processing in 500, and "specified first crank angle acquisition means" according to the seventh aspect of the present invention is realized by the ECU 40 executing the processing in step 502.

Embodiment 4

Next, Embodiment 4 of the present invention will be described referring to FIG. 15.

The system of the present embodiment can be realized by using the hardware configuration shown in FIG. 1, and causing the ECU 40 to execute a routine shown in FIG. 15 described later, instead of the routine shown in FIG. 7.

[Method for Detecting Combustion Status Utilizing in-Cylinder Pressure Sensor According to Embodiment 4]

As described above in Embodiments 1 to 3, with regard to utilization of the amount of heat release amount variation ΔQ to acquire an actual heat release amount Qt including the maximum actual heat release amount Qtmax, the same method can be used irrespective of the combustion form. However, depending on which form among retarded combustion, normal combustion and advanced combustion (abnormal combustion) the combustion form is, there are differences in the method for detecting CAα utilizing the amount of heat release amount variation ΔQ.

(Method for Distinguishing Combustion Form)

Accordingly, in the present embodiment a configuration is adopted so as to use the amount of heat release amount variation ΔQ and the calculated heat release amount Q to distinguish the combustion form for each cycle during operation of the internal combustion engine 10 by means of the method described hereunder. Further, the CA50 is then acquired by a detection method that is suited to a distinguished combustion form. Note that, although a method of acquiring CA50 is exemplified here, the method of the present embodiment is also applicable to an arbitrary CAα other than CA50.

As will be understood by comparing FIGS. 4, 10 and 13, a rate of change (slope of waveform of ΔQ) in the amount of heat release amount variation ΔQ at the compression top dead center becomes a large value at a time of normal combustion (FIGS. 10A and 10B), which differs from a time of retarded combustion (FIGS. 4A through 4C) and a time of advanced combustion (FIGS. 13A and 13B) when the rate of change is a small value equivalent to zero. Therefore, in the present embodiment, in a cycle in which the rate of change in the amount of heat release amount variation ΔQ at the compression top dead center is greater than a predetermined value, it is determined that the combustion form in the cycle is normal combustion.

Furthermore, in a cycle in which the rate of change in the amount of heat release amount variation ΔQ in the vicinity of the compression top dead center is equal to or less than the aforementioned predetermined value, retarded combustion and advanced combustion are distinguished by the following method. That is, the second crank angle $\theta_{2CA50}$ that is a crank angle corresponding to CA50 on the data of ΔQ, and the first crank angle $\theta_{1CA50}$ that forms a pair with the second crank angle $\theta_{2CA50}$ are acquired (that is, a crank angle where a distance from TDC which positioned at the center therebetween is the same as that at the second crank angle $\theta_{2CA50}$ (in other words, a crank angle where the in-cylinder volume V is the same as that at the second crank angle $\theta_{2CA50}$)). Further, it is determined which is the larger value among the rate of change (slope of waveform of Q) of the calculated heat release amount Q at the second crank angle $\theta_{2CA50}$, and the rate of change of the calculated heat release amount Q at the first crank angle $\theta_{1CA50}$. As will be clear by comparing FIGS. 4A through 4C with FIGS. 13A and 13B, at a time of retarded combustion, the rate of change in the calculated heat release amount Q at the second crank angle $\theta_{2CA50}$ is greater than the rate of change in the calculated heat release amount Q at the first crank angle $\theta_{1CA50}$, while at a time of advanced combustion, the rate of change in the calculated heat release amount Q at the first crank angle $\theta_{1CA50}$ is greater than the rate of change in the calculated heat release amount Q at the second crank angle $\theta_{2CA50}$. Thus, it is possible to distinguish between retarded combustion and advanced combustion by using this determination method.

(Specific Processing Relating to Detection of Combustion Status in Embodiment 4)

FIG. 15 is a flowchart illustrating a routine that the ECU 40 executes in order to realize a method for detecting the combustion status during advanced combustion in Embodiment 4 of the present invention. In FIG. 15, steps that are the same as steps shown in FIGS. 7, 12 and 14 in Embodiments 1 to 3 are denoted by the same reference numerals, and a description thereof is omitted or abbreviated.

In the routine illustrated in FIG. 15, after calculating data of amount of heat release amount variation ΔQ that is synchronized with the crank angle in step 104, the ECU 40 acquires the maximum value ΔQmax of the acquired data of amount of heat release amount variation ΔQ as the maximum actual heat release amount Qtmax (step 106).

Next, the ECU 40 determines whether or not the rate of change in the amount of heat release amount variation ΔQ at the compression top dead center (TDC) is greater than a predetermined value (step 600). The predetermined value in step 600 is a value that is previously set as a threshold value of the aforementioned rate of change for distinguishing normal combustion from other combustion forms (retarded combustion and advanced combustion).

If the result determined in step 600 is affirmative, that is, if it can be determined that the slope of the waveform of ΔQ at TDC is not flat, the ECU 40 advances to step 602. In step 602, processing (steps 400 and 402) to detect CA50 for a time of normal combustion is executed.

On the other hand, if the result determined in step 600 is negative, that is, if it can be determined that the slope of the waveform of ΔQ at TDC is flat, the ECU 40 then acquires the second crank angle $\theta_{2CA50}$ corresponding to CA50 and the first crank angle $\theta_{1CA50}$ that forms a pair with the second crank angle $\theta_{2CA50}$, utilizing the data of amount of heat release amount variation ΔQ acquired in step 104 and equation (6) or (7) (step 604).

When the aforementioned processing in step 604 is executed, next, the ECU 40 determines whether or not the rate of change in the calculated heat release amount Q at the second crank angle $\theta_{2CA50}$ is greater than the rate of change in the calculated heat release amount Q at the first crank angle $\theta_{1CA50}$ (step 606). If the result determined in step 606 is affirmative, the ECU 40 advances to step 608 to execute processing to detect CA50 for a time of retarded combustion. Specifically, the second crank angle $\theta_{2CA50}$ is finally acquired as CA50.

In contrast, if the result determined in step 606 is negative, the ECU 40 advances to step 610 to execute processing to detect CA50 for a time of advanced combustion. Specifically, the first crank angle $\theta_{1CA50}$ is finally acquired as CA50.

According to the routine illustrated in FIG. 15 described above, the combustion form is distinguished during operation of the internal combustion engine 10, and CA50 can be precisely detected without being affected by the deviation amount $e_p$ (error of absolute pressure correction) of the in-cylinder pressure P using detection processing that is suited to the distinguished current combustion form.

In the above described Embodiment 4, in order to distinguish whether the current state is a time of normal combustion or a time of another kind of combustion, a configuration is adopted that determines whether or not a rate of change in the amount of heat release amount variation ΔQ at the compression top dead center is greater than a predetermined value. However, this method for distinguishing the combustion form is not limited to a method that uses the amount of heat release amount variation ΔQ. That is, at a time of normal combustion as defined in the present description, since the compression top dead center is located in the combustion period, the rate of change in the calculated heat release amount Q at compression top dead center is larger than the other combustion forms. Therefore, the aforementioned method for distinguishing the combustion form may be a method that, instead of using the amount of heat release amount variation ΔQ, determines whether or not a rate of change in the calculated heat release amount Q at the compression top dead center is greater than a predetermined value.

Note that, in the above described Embodiment 4, the first crank angle $\theta_{1CA50}$ that forms a pair with the 50% combustion point $\theta_{2CA50}$ corresponds to "specified first crank angle" according to the sixth aspect of the present invention, and "specified first crank angle acquisition means" according to the sixth aspect of the present invention is realized by the ECU 40 executing the aforementioned processing in step 604.

Other Modifications

In the above described Embodiments 1 to 4, data of amount of heat release amount variation ΔQ that takes as an object a crank angle period that is assumed in advance to be a crank angle period which includes a combustion period is calculated, and the maximum value ΔQmax thereof is acquired as the maximum actual heat release amount Qtmax. Consequently, at a stage at which calculation of the data of amount of heat release amount variation ΔQ is finished, that is, at a stage at which the combustion start point CA0 and the combustion end point CA100 cannot yet be precisely ascertained, the maximum actual heat release amount Qtmax can be acquired by utilizing the data (waveform) of the amount of heat release amount variation ΔQ. However, the calculation method for the maximum actual heat release amount in the present invention is not necessarily limited to a method which utilizes discovering the maximum value of the data of amount of heat release amount variation. That is, the calculation method may be a method that ascertains in advance the first crank angle $\theta_1$ on the advanced side relative to the combustion start point CA0, and the second crank angle $\theta_2$ that is a crank angle on the retarded side relative to the combustion end point CA100 and that forms a pair with the first crank angle $\theta_1$, and acquires, as the maximum actual heat release amount Qtmax, an amount of heat release amount variation ΔQ corresponding to the pair of crank angles $\theta_1$ and $\theta_2$.

Further, in the above described Embodiments 1 to 4, the amount of heat release amount variation ΔQ that is a difference between the first calculated heat release amount $Q_1$ and the second calculated heat release amount $Q_2$ is calculated as a value $(Q_2-Q_1)$ that is obtained by subtracting the first calculated heat release amount $Q_1$ from the second calculated heat release amount $Q_2$. However, instead of the value $(Q_2-Q_1)$, the amount of heat release amount variation ΔQ that is used for acquiring an estimated value of the actual heat release amount Qt in the present invention may be an absolute value $(|Q_1-Q_2|)$ of a difference that is obtained by subtracting the second calculated heat release amount $Q_2$ from the first calculated heat release amount $Q_1$.

Further, the above Embodiments 1 to 4 have been described taking as an example the internal combustion engine 10 that is equipped with a piston-crank mechanism in which the rotation center of the crankshaft 16 and the axial center of the piston pin 13 are on the cylinder center axis. In an internal combustion engine equipped with a piston-crank mechanism, there are many cases in which, for the purpose of reducing friction loss that is caused by a reduction in a side thrust load on a piston in an expansion stroke, a so-called "offset crank" is often adopted that is a configuration in which the rotation center of the crankshaft is set at a position that deviates from a position on the cylinder center axis. When such a configuration is adopted, unlike the waveform illustrated in FIG. 3B, a waveform of the in-cylinder volume V with respect to the crank angle θ does not become bilaterally symmetrical about the compression top dead center. Consequently, values of the in-cylinder volume V of a pair of crank angles that are at equal distances from TDC which is positioned at the center therebetween do not become the same value. This situation is not limited to an example in which the rotation center of the crankshaft is offset with respect to the cylinder center axis by means of offset crank, and similarly applies in a configuration in which the axial center of a piston pin is offset with respect to the cylinder center axis even if the rotation center of the crankshaft is not offset. In the present invention, calculated heat release amounts ($Q_1$ and $Q_2$) at a pair of crank angles ($\theta_1$ and $\theta_2$) at which the in-cylinder volume V is the same are utilized for calculation of an amount of heat release amount variation ΔQ. Therefore, the present invention can also be applied in a similar manner to an internal combustion engine in which this kind of offset crank is adopted.

Furthermore, in the above described Embodiment 1 and the like, a configuration is adopted that determines the occurrence or non-occurrence of pre-ignition utilizing CA50 that is the combustion center. However, a crank angle that is used for determining the occurrence or non-occurrence of pre-ignition in the present invention is not limited to CA50, and may be an arbitrary crank angle CAα at which MFB reaches a predetermined fraction α.

DESCRIPTION OF SYMBOLS 10 internal combustion engine
12 piston
13 piston pin
14 connecting rod
16 crankshaft
18 combustion chamber
20 intake passage
22 exhaust passage
24 intake valve
26 exhaust valve
28 throttle valve
30 fuel injection valve
32 spark plug
34 in-cylinder pressure sensor
40 electronic control unit (ECU)
42 crank angle sensor
44 air flow sensor

The invention claimed is:

1. A combustion status detection device for an internal combustion engine that is a reciprocating internal combustion engine, comprising:
a crank angle detector configured to acquire a crank angle;
an in-cylinder pressure sensor configured to detect an in-cylinder pressure; and
an ECU (electronic control unit), the ECU is programmed to:
(a) use an in-cylinder pressure obtained after performing absolute pressure correction with respect to an in-cylinder pressure detected by the in-cylinder pressure sensor and a crank angle acquired by the crank angle detector to calculate, in synchronization with a crank angle, calculated heat release amount data that is data of a heat release amount in a cylinder; and
(b) where a crank angle during a compression stroke is taken as a first crank angle, a crank angle which is a crank angle in an expansion stroke and at which an in-cylinder volume that is a same volume as an in-cylinder volume at the first crank angle is obtained is taken as a second crank angle, a calculated heat release amount that is calculated by the ECU as a heat release amount at the first crank angle is taken as a first calculated heat release amount, and a calculated heat release amount that is calculated by the ECU as a heat release amount at the second crank angle is taken as a second calculated heat release amount, estimate a maximum actual heat release amount based on an amount of heat release amount variation that is a difference between the first calculated heat release amount at the first crank angle on an advanced side relative to a combustion start point and the second calculated heat release amount at the second crank angle on a retarded side relative to a combustion end point, wherein
when the estimated maximum actual heat release amount is less than a predetermined second determination value, the combustion status detection device detects a misfiring of combustion status and the ECU performs fuel injection control and/or ignition control based on the detected misfiring.

2. The combustion status detection device according to claim 1, wherein the ECU is programmed to:
(c) calculate, in synchronization with a crank angle, data of amount of heat release amount variation that is a difference between the first calculated heat release amount and the second calculated heat release amount in a crank angle period including a combustion period; and
(d) estimate a maximum actual heat release amount using a maximum value of the data of amount of heat release amount variation.

3. The combustion status detection device according to claim 1, wherein the ECU is programmed to:
(e) calculate, in synchronization with a crank angle, data of amount of heat release amount variation that is a difference between the first calculated heat release amount and the second calculated heat release amount in a crank angle period including a combustion period;
(f) calculate the amount of the heat release amount variation as a value obtained by subtracting the first calculated heat release amount from the second calculated heat release amount, and use the calculated heat release amount data to acquire the data of amount of the heat release amount variation in association with the second crank angle;
(g) at a time of normal combustion in which a combustion start point is a crank angle on an advanced side relative to a compression top dead center and a combustion end point is a crank angle on a retarded side relative to the compression top dead center, acquire a predetermined fraction combustion point that is a crank angle at which mass fraction burned reaches a predetermined fraction; and
(h) acquire the predetermined fraction combustion point at the time of normal combustion based on the calculated heat release amount data during a deemed combustion period obtained by regarding, as a combustion end point, a heat-release-amount-variation maximum crank angle at which an amount of heat release amount variation in the data of amount of heat release amount variation reaches a maximum value, and by regarding, as a combustion start point, a specified first crank angle which is a crank angle positioned on an opposite side to the heat-release-amount-variation maximum crank angle across the compression top dead center and at which an in-cylinder volume is obtained that is a same volume as an in-cylinder volume at the heat-release-amount-variation maximum crank angle.

4. The combustion status detection device according to claim 3,
wherein the ECU is programmed, where a rate of change in the calculated heat release amount in a vicinity of the compression top dead center in the calculated heat release amount data, or a rate of change in the amount of heat release amount variation in a vicinity of the compression top dead center in the data of amount of heat release amount variation is greater than a predetermined value, to determine that normal combustion is being performed.

5. The combustion status detection device according to claim 1,
wherein the ECU is programmed to:
(i) calculate, in synchronization with a crank angle, data of amount of heat release amount variation that is a difference between the first calculated heat release amount and the second calculated heat release amount in a crank angle period including a combustion period;

(j) calculate the amount of the heat release amount variation as a value obtained by subtracting the first calculated heat release amount from the second calculated heat release amount, and use the calculated heat release amount data to acquire the data of amount of the heat release amount variation in association with the second crank angle;

(k) at a time of retarded combustion in which a combustion start point is a crank angle equal to a compression top dead center or a crank angle on a retarded side relative to the compression top dead center, acquire a predetermined fraction combustion point that is a crank angle at which mass fraction burned reaches a predetermined fraction; and (l) regard, as a combustion start point, a crank angle at which the amount of heat release amount variation starts to increase from zero in the data of amount of heat release amount variation and regard, as a combustion end point, a heat-release-amount-variation maximum crank angle at which the amount of heat release amount variation reaches a maximum value in the data of amount of heat release amount variation data, and acquire, as the predetermined fraction combustion point at the time of retarded combustion, a specified second crank angle at which the amount of heat release amount variation in the data of amount of heat release amount variation reaches the predetermined fraction with respect to a maximum value of the amount of heat release amount variation.

6. The combustion status detection device according to claim 5, wherein the ECU is programmed to:

(m) acquire a specified first crank angle which is a crank angle positioned on an opposite side to the specified second crank angle across the compression top dead center and at which an in-cylinder volume is obtained that is a same volume as an in-cylinder volume at the specified second crank angle; and (n) where a rate of change in the calculated heat release amount in a vicinity of the compression top dead center in the calculated heat release amount data, or a rate of change in the amount of heat release amount variation in a vicinity of the compression top dead center in the data of amount of heat release amount variation is equal to or less than a predetermined value, and where a rate of change in the calculated heat release amount at the specified second crank angle in the calculated heat release amount data is larger than a rate of change in the calculated heat release amount at the specified first crank angle in the calculated heat release amount data, determine that retarded combustion is being performed.

7. The combustion status detection device according to claim 1, wherein the ECU is programmed to:

(o) calculate, in synchronization with a crank angle, data of amount of heat release amount variation that is a difference between the first calculated heat release amount and the second calculated heat release amount in a crank angle period including a combustion period;

(p) calculate the amount of the heat release amount variation as a value obtained by subtracting the first calculated heat release amount from the second calculated heat release amount, and use the calculated heat release amount data to acquire the data of amount of the heat release amount variation in association with the second crank angle;

(q) at a time of advanced combustion in which a combustion end point is a crank angle equal to a compression top dead center or a crank angle on an advanced side relative to the compression top dead center, acquire a predetermined fraction combustion point that is a crank angle at which mass fraction burned reaches a predetermined fraction;

(r) regard, as a combustion end point, a crank angle at which the amount of heat release amount variation starts to increase from zero in the data of amount of heat release amount variation and regard, as a combustion start point, a heat-release-amount-variation maximum crank angle at which the amount of heat release amount variation reaches a maximum value in the data of amount of heat release amount variation, and acquire a specified second crank angle at which an absolute value of a difference between a maximum value of the amount of heat release amount variation and an amount of heat release amount variation reaches the predetermined fraction with respect to the maximum value of the amount of heat release amount variation;

(s) acquire a specified first crank angle which is a crank angle positioned on an opposite side to the specified second crank angle across the compression top dead center and at which an in-cylinder volume is obtained that is a same volume as an in-cylinder volume at the specified second crank angle; and (t) acquire the specified first crank angle as the predetermined fraction combustion point at the time of advanced combustion.

8. The combustion status detection device according to claim 7,
wherein the ECU is programmed, where a rate of change in the calculated heat release amount in a vicinity of the compression top dead center in the calculated heat release amount data, or a rate of change in the amount of heat release amount variation in a vicinity of the compression top dead center in the data of amount of heat release amount variation is equal to or less than a predetermined value, and where a rate of change in the calculated heat release amount at the specified first crank angle in the calculated heat release amount data is larger than a rate of change in the calculated heat release amount at the specified second crank angle in the calculated heat release amount data, to determine that advanced combustion is being performed.

9. The combustion status detection device according to claim 7, wherein the ECU is programmed to determine that pre-ignition has occurred when the predetermined fraction combustion point is advanced relative to a predetermined first determination value.

* * * * *